US011985489B2

(12) United States Patent
Kotaki et al.

(10) Patent No.: US 11,985,489 B2
(45) Date of Patent: May 14, 2024

(54) SOUND PROCESSING METHOD, TERMINAL, AND SOUND SYSTEM

(71) Applicant: YAMAHA CORPORATION, Hamamatsu (JP)

(72) Inventors: Hiroshi Kotaki, Hamamatsu (JP); Mitsutaka Goto, Yokohama (JP); Mizuyuki Shirai, Hamamatsu (JP); Akihiro Sonogi, Hamamatsu (JP); Takahiro Senda, Hamamatsu (JP); Hitomi Shimizu, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 175 days.

(21) Appl. No.: 17/859,296

(22) Filed: Jul. 7, 2022

(65) Prior Publication Data

US 2023/0010955 A1 Jan. 12, 2023

(30) Foreign Application Priority Data

Jul. 12, 2021 (JP) ................................ 2021-114949

(51) Int. Cl.
*H04R 3/12* (2006.01)

(52) U.S. Cl.
CPC ...................................... *H04R 3/12* (2013.01)

(58) Field of Classification Search
CPC ................ H04R 3/12; H04R 2227/003; H04R 2227/005
USPC .................................. 381/17, 118, 119, 334
See application file for complete search history.

(56) References Cited

U.S. PATENT DOCUMENTS

| | | | | |
|---|---|---|---|---|
| 2010/0260348 A1* | 10/2010 | Bhow | H04N 21/25891 | 381/81 |
| 2010/0284389 A1* | 11/2010 | Ramsay | H04R 5/02 | 370/338 |
| 2014/0143338 A1* | 5/2014 | Jung | H04N 1/00148 | 709/204 |
| 2022/0036907 A1* | 2/2022 | Liu | G10L 21/02 | |

FOREIGN PATENT DOCUMENTS

JP H06350490 A 12/1994

* cited by examiner

*Primary Examiner* — William A Jerez Lora
(74) *Attorney, Agent, or Firm* — ROSSI, KIMMS & McDOWELL LLP

(57) ABSTRACT

In a sound processing method of operating audio equipment to perform sound processing relating to audio content in accordance with one embodiment, a distributor terminal communicates with the audio equipment and at least one listener terminal, the distributor terminal distributes the audio content from the distributor terminal to the at least one listener terminal, the distributor terminal specifies an operation listener terminal, from among the at least one listener terminal, that is permitted to change a sound processing parameter of the audio equipment, the operation listener terminal accepts the sound processing parameter changed by the operation listener terminal, the operation listener terminal transmits the sound processing parameter changed by the operation listener terminal to the distributor terminal, and the audio equipment performs the sound processing based on the changed sound processing parameter changed by the operation listener terminal.

20 Claims, 15 Drawing Sheets

SOUND PROCESSING METHOD, TERMINAL, AND SOUND SYSTEM

CROSS REFERENCE TO RELATED APPLICATIONS

This Nonprovisional application claims priority under 35 U.S.C. § 119(a) on Patent Application No. 2021-114949 filed in Japan on Jul. 12, 2021, the entire contents of which are hereby incorporated by reference.

BACKGROUND

Technical Field

One embodiment in accordance with this disclosure relates to a sound processing method, a terminal, and a sound system in content distribution.

Background Information

Unexamined Japanese Patent Publication NO. H06-350490 discloses a remote mixing device. The remote mixing device is provided with a remote fader, a cable, and a mixer. The remote fader and the mixer are connected to each other through the cable. The mixer inputs a signal from the remote fader through the cable.

SUMMARY

A content distributor operates audio equipment, while distributing content. The distributor, however, performs a performance (e.g., playing a musical instrument or the like) for producing sounds actually. In this case, the distributor will hear the sounds produced by own performance. On the other hand, a content listener may hear only the distributed sounds. Accordingly, the distributor can hardly operate audio equipment, while hearing the same sound as the listener receiving the content distribution. In other words, the distributor can hardly operate audio equipment under the same condition and environment as the other terminals receiving the content distribution.

One embodiment of the present disclosure aims to provide a sound processing method capable of causing an audio equipment operator to perform sound processing (sound processing related to content) in a distribution source under the same condition and environment as the other terminals receiving content distribution.

In a sound processing method of operating audio equipment to perform sound processing relating to audio content in accordance with one embodiment of the present disclosure, a distributor terminal communicates with the audio equipment and at least one listener terminal, the distributor terminal distributes the audio content from the distributor terminal to the at least one listener terminal, the distributor terminal specifies an operation listener terminal, from among the at least one listener terminal, that is permitted to change a sound processing parameter of the audio equipment, the operation listener terminal accepts the sound processing parameter changed by the operation listener terminal, the operation listener terminal transmits the sound processing parameter changed by the operation listener terminal to the distributor terminal, and the audio equipment performs the sound processing based on the changed sound processing parameter changed by the operation listener terminal.

According to the sound processing method in accordance with one embodiment of this disclosure, an operator can perform sound processing in a distribution source under the same condition and environment as the other terminals receiving content distribution.

DETAILED DESCRIPTION

First Embodiment

Figure 1:
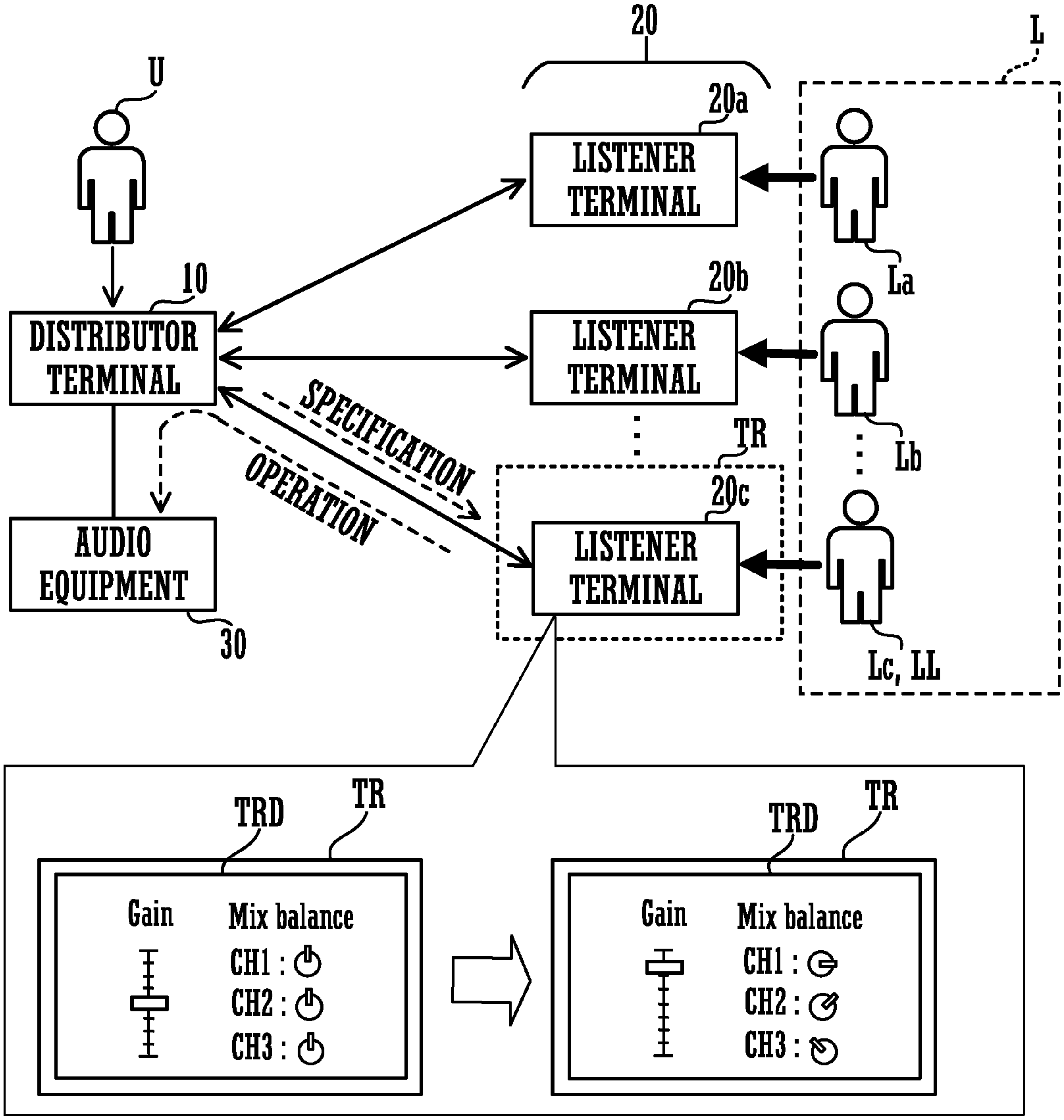
FIG. 1 is a block diagram exemplarily showing a connection between a distributor terminal 10, a listener terminal 20, and audio equipment 30.
Figure 2:
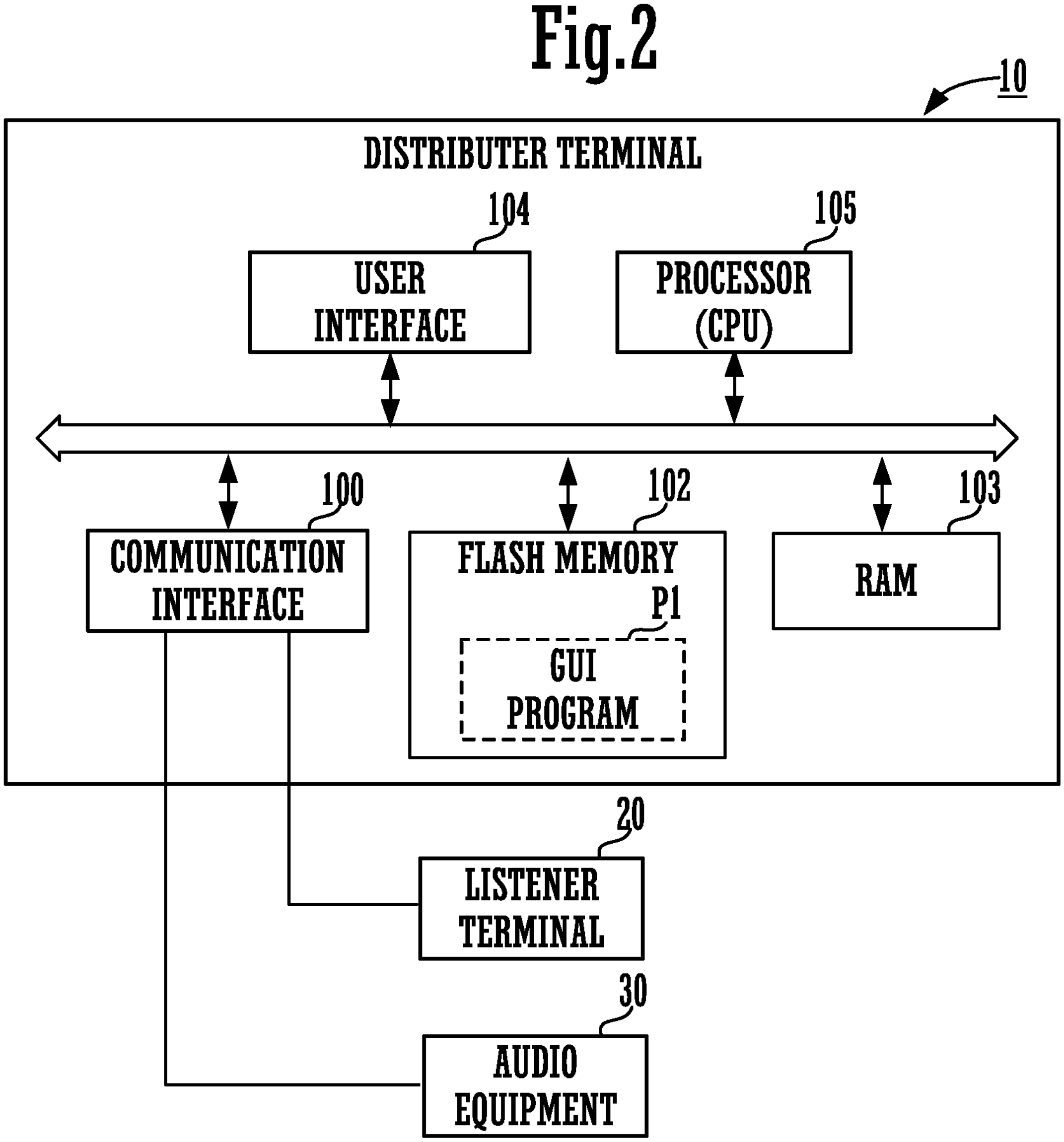
FIG. 2 is a block diagram exemplarily showing a configuration of the distributor terminal 10.
Figure 3:
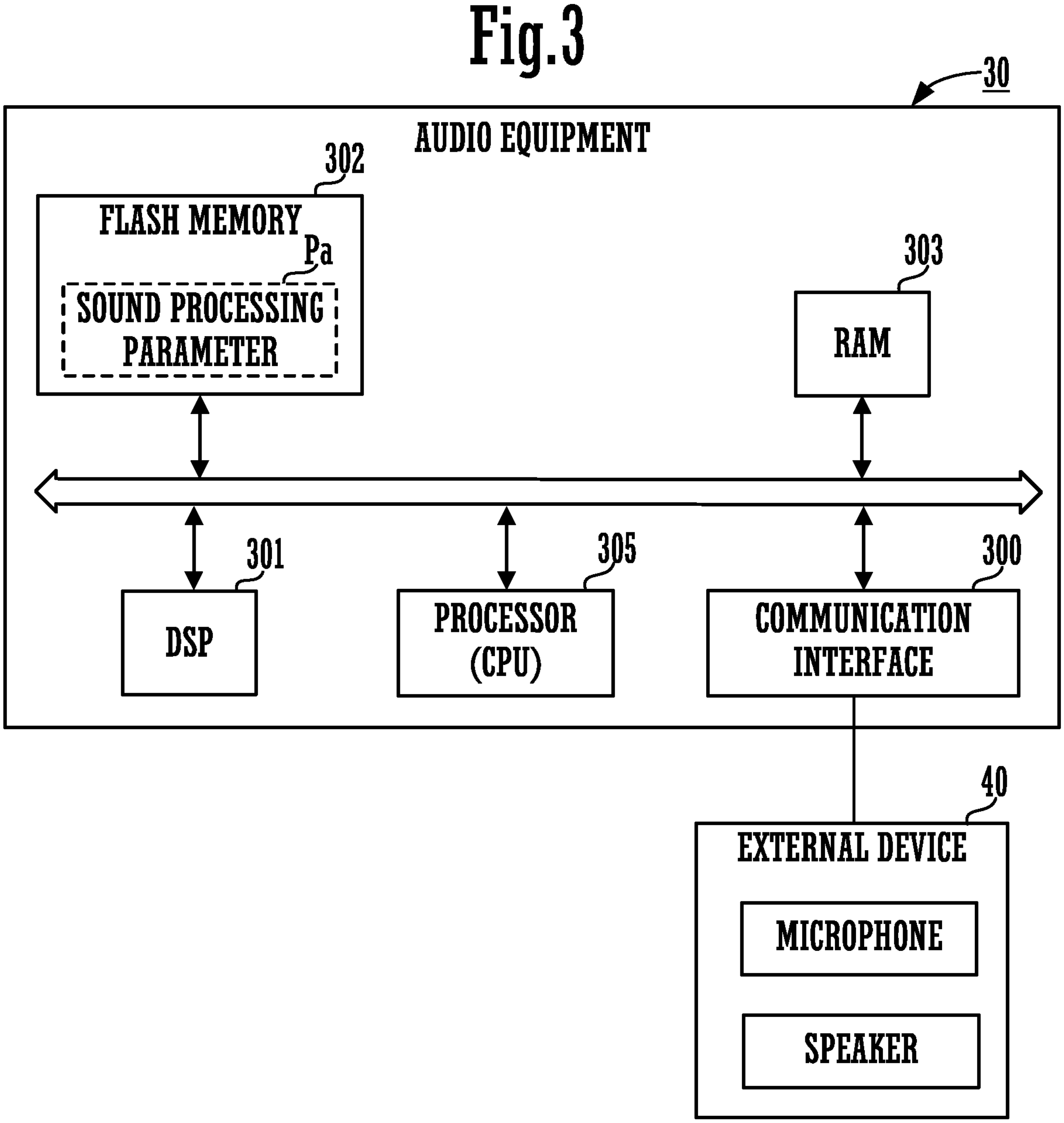
FIG. 3 is a block diagram exemplarily showing a configuration of the audio equipment 30.

Hereinafter, a terminal in accordance with a first embodiment will be described with reference to the drawings. FIG. 1 is a block diagram exemplarily showing a connection between a distributor terminal 10, a listener terminal 20, and audio equipment 30. FIG. 2 is a block diagram exemplarily showing a configuration of the distributor terminal 10. FIG. 3 is a block diagram exemplarily showing a configuration of the audio equipment 30.

The distributor terminal 10 is a terminal that distributes content. The distributor terminal 10 is used by a content distributor U as shown in FIG. 1. One or more listeners L view and listen to the distributed content. In other words, the distributor terminal 10 distributes content to one or more listener terminals 20. The distributor terminal 10 communicates with the one or more listener terminals 20 through a communication line, for example. The communication line is an Internet line, for example. In the present embodiment, the distributor terminal 10 performs distribution having real-time properties. In this case, the distribution means streaming distribution or the like, for example. For instance, such distribution can be achieved by establishing a virtual distribution server or the like in the distributor terminal 10.

Note that, the communication line may not necessarily be an Internet line. The communication between the distributor terminal 10 and the listener terminal 20 may be performed through a private network or the like, which is not connected to the Internet.

The distributor terminal 10 is provided with a communication interface 100, a flash memory 102, a RAM (Random Access Memory) 103, a user interface 104, and a processor 105, as shown in FIG. 2.

The communication interface 100 communicates with a device (hereinafter, referred to as an external device) different from the distributor terminal 10 through a signal line, as shown in FIG. 2. The distributor terminal 10 and the external device are communicated with each other through an acoustic cable or the like in a wired manner, or through Wi-Fi (registered trademark), Bluetooth (registered trademark), or the like in a wireless manner. The communication interface 100 includes a USB, HDMI (registered trademark), a network interface, an audio interface, an MIDI interface, and the like, for example. In the present embodiment, the distributor terminal 10 and the listener terminal 20 are connected to each other through a network interface.

The flash memory 102 stores various kinds of data. Specifically, the various kinds of data include a program, data, and the like to achieve a function of the distributor terminal 10. For instance, the flash memory 102 stores data for content distribution, or the like. Further, the flash memory 102 stores a program for establishing a connection between the distributor terminal 10 and the listener terminal 20, a program for transmitting and receiving data between the distributor terminal 10 and the listener terminal 20, and the like. Such a problem includes a program for encoding a signal, a program for transmitting and receiving the encoded signal, and the like, for example.

The RAM 103 temporarily stores the data stored in the flash memory 102.

The user interface 104 outputs and inputs an operation of the distributor U. Thus, in the present embodiment, the distributor U causes the distributor terminal 10 to perform an operation related to distribution. The operation related to distribution is a volume control of distribution or the like, for example. Such a user interface 104 is a keyboard, a mouse, a touch panel, or the like, for example.

The processor 105 controls an operation of the distributor terminal 10. Specifically, the processor 105 performs various kinds of operations by reading out the program stored in the flash memory 102 to the RAM 103. Such a processor 105 is a CPU (Central Processing Unit), for example. Note that, the program is not required to be stored in the flash memory 102. For instance, the processor 105 downloads a program from a device different from the distributor terminal 10 through a network. After that, the processor 105 may read out the downloaded program to the RAM 103.

The distributor terminal 10 as mentioned above is a PC, a smart phone, or the like, for example.

In the present embodiment, the content is audio content related to sounds produced in a performance or the like, for example. Accordingly, the distributor terminal 10 obtains a sound signal subjected to sound processing. Specifically, the sound signal is a digital signal obtained by sampling sounds at a predetermined sampling rate. The distributor terminal 10 transmits the sound signal to one or more listener terminals 20. A method for the distributor terminal 10 to obtain the sound signal is the method performed by inputting the sound signal from the audio equipment 30 as shown in FIGS. 1 and 2, for example. The audio equipment 30 performs adjustment of the sound signal, output of the sound signal, and the like. Accordingly, in the present embodiment, the audio equipment 30 performs sound processing related to the content. Specifically, the distributor terminal 10 communicates with the audio equipment 30, as shown in FIGS. 1 and 2. In more detail, the distributor terminal 10 communicates with the audio equipment 30 through the communication interface 100. The distributor terminal 10 receives the sound signal, which is subjected to the sound processing, from the audio equipment 30. The distributor terminal 10 transmits the received sound signal to the listener terminal 20.

The audio equipment 30 performs the sound processing based on a sound processing parameter Pa. The sound processing parameter Pa is a parameter related to sound processing such as gain control and mixing. The sound processing parameter Pa includes a gain value, a mix balance value, and the like, for example. When a value of the sound processing parameter Pa is changed, the sound processing to be performed in the audio equipment 30 is changed. For instance, it is assumed that the sound processing parameter Pa is a gain value. If the gain value is increased or decreased, an amplification amount of the sound signal will be changed. Note that, the sound processing to be performed in the audio equipment 30 is not limited only to gain control and mixing. For instance, the audio equipment 30 may perform another sound processing such as equalizing and compressing. In other words, the sound processing parameter Pa may include another value other than a gain value or a mix balance value.

The audio equipment 30 is provided with a communication interface 300, a DSP (Digital Signal Processor) 301, a flash memory 302, a RAM 303, and a processor 305, as shown in FIG. 3.

The communication interface 300 communicates with an external device different from the audio equipment 30. In other words, the audio equipment 30 communicates with the distributor terminal 10 through the communication interface 300. Further, the communication interface 300 communicates with the external device 40 different from the distributor terminal 10, as shown in FIG. 3. The external device 40 includes audio equipment. The external device 40 is a speaker, a microphone, or the like, as shown in FIG. 3. The communication interface 300 is a USB or HDMI (registered trademark), for example. Note that, the external device 40 and the audio equipment 30 may be connected to each other through an interface, such as an audio interface and a MIDI interface.

The DSP 301 applies signal processing to a sound signal. The signal processing is sound processing such as gain control and mixing, for example.

The flash memory 302 stores various kinds of programs. The various kinds of programs include a program for operating the audio equipment 30, for example. Further, the flash memory 302 stores a sound processing parameter Pa related to the sound processing.

The RAM 303 temporarily stores a predetermined program stored in the flash memory 302.

The processor 305 controls an operation of the audio equipment 30. Specifically, the processor 305 performs various kinds of operations by reading out the predetermined program stored in the flash memory 302 to the RAM 303. Such a processor 305 is a CPU, for example. Note that, the program is not required to be stored in the flash memory 302 located inside the audio equipment 30. For instance, the processor 305 downloads the program from an external device, which is located outside the audio equipment 30, through a network. After that, the processor 305 may read out the downloaded program to the RAM 303.

The audio equipment 30 as mentioned above is a mixer or the like, for example.

Figure 4:
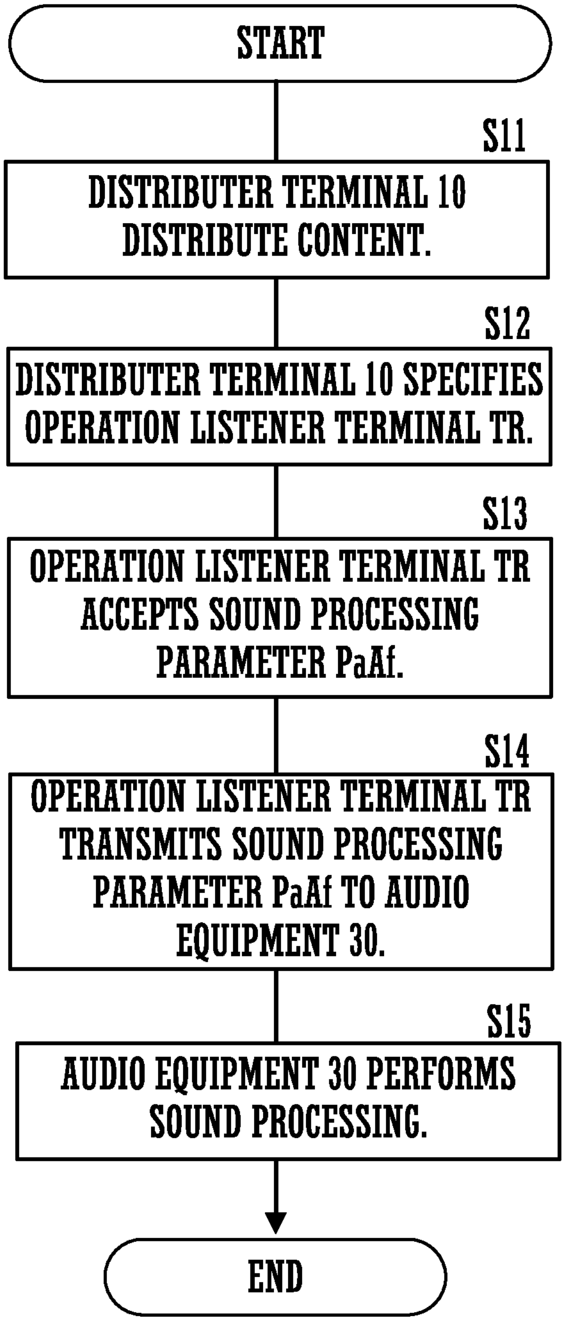
FIG. 4 is a flow chart exemplarily showing processing of the distributor terminal 10 and an operation listener terminal TR.

By the way, the distributor terminal 10 in accordance with the present embodiment has a function that causes the listener L to operate the audio equipment 30 at the timing when the distributor U desires. Hereinafter, the function will be described with reference to FIGS. 1 and 4. FIG. 4 is a flowchart exemplarily showing processing of the distributor terminal 10 and the operation listener terminal TR.

First, the distributor U starts content distribution. Specifically, the distributor terminal 10 distributes content to one or more listener terminals 20 (FIG. 4: step S11). In the example shown in FIG. 1, each of listeners La, Lb, and Lc listens to the distributed content through a corresponding one of listener terminals 20*a*, 20*b*, and 20*c*.

Next, among the listeners L listening to the distributed content, the distributor U specifies an operator LL to whom operation authority of the audio equipment 30 is to be transferred. Specifically, among the one or more listener terminals 20, the distributor terminal 10 specifies an operation listener terminal TR that is permitted to change a sound processing parameter Pa of the audio equipment 30 (FIG. 4: step S12). In the example shown in FIG. 1, a plurality of listener terminals 20 (listener terminals 20*a*, 20*b*, and 20*c*) are connected to the distributor terminal 10. Herein, it is assumed that the distributor U desires the listener Lc to operate the audio equipment 30. The distributor U specifies the listener terminal 20*c* as an operation listener terminal TR through the distributor terminal 10. By the specification, the operation listener terminal TR is permitted to operate the audio equipment 30. Thus, the operation listener terminal TR can operate the audio equipment 30. In this case, the listeners Lc is set to be an operator LL for operating the audio equipment 30.

Next, the operator LL changes a sound processing parameter Pa through the operation listener terminal TR. In other words, the operation listener terminal TR accepts the sound processing parameter Pa changed by the operation listener terminal TR (FIG. 4: step S13). In the example shown in FIG. 1, the operation listener terminal TR is provided with a display TRD. In this case, for example, the display TRD displays a GUI (Graphical User Interface) related to an operation of the sound processing parameter Pa, or the like. Thus, the operator LL changes the sound processing parameter Pa through the GUI. In the example shown in FIG. 1, the display TRD displays a fader, a knob, and the like, as the GUI. In the example shown in FIG. 1, the fader is a GUI related to a change of a gain value. Accordingly, if the gain value is desired to be changed, the operator LL will operate the fader. In the example shown in FIG. 1, the knob is a GUI related to adjustment of mix balance. Accordingly, if the mix balance is desired to be adjusted, the operator LL will operate the knob. The operation listener terminal TR detects the operation performed on the GUI by the operator LL. After that, the operation listener terminal TR stores a value of the sound processing parameter Pa, which is based on the operation performed on the GUI, in a storage device of the operation listener terminal TR. Hereinafter, the sound processing parameter Pa, which has been changed, is referred to as a sound processing parameter PaAf. Note that, although the method to change the sound processing parameter Pa using the GUI is described as an example, the GUI may not necessarily accept a change of the sound processing parameter.

Next, the operation listener terminal TR transmits a sound processing parameter PaAf, which is obtained by changing the sound processing parameter Pa, to the audio equipment 30 (FIG. 4: step S14). Specifically, the operation listener terminal TR transmits the sound processing parameter PaAf to the distributor terminal 10. The distributor terminal 10, which has received the sound processing parameter PaAf, transmits the sound processing parameter PaAf to the audio equipment 30.

Finally, the audio equipment 30 performs sound processing based on the sound processing parameter PaAf changed by the operation listener terminal TR (FIG. 4: step S15). Specifically, a sound processing parameter PaBe, which is a parameter before being changed, is recorded in the flash memory 302 of the audio equipment 30. The audio equipment 30 updates the sound processing parameter PaBe to the received sound processing parameter PaAf. Thus, based on the sound processing parameter PaAf set by the operator LL, the audio equipment 30 performs sound processing. As a result, the listeners L can hear sounds based on the operation performed by the operator LL.

When the content is being distributed, the distributor terminal 10, the operation listener terminal TR, and the audio equipment 30 can repeat the processes from the step S12 to the step S15.

Figure 5:
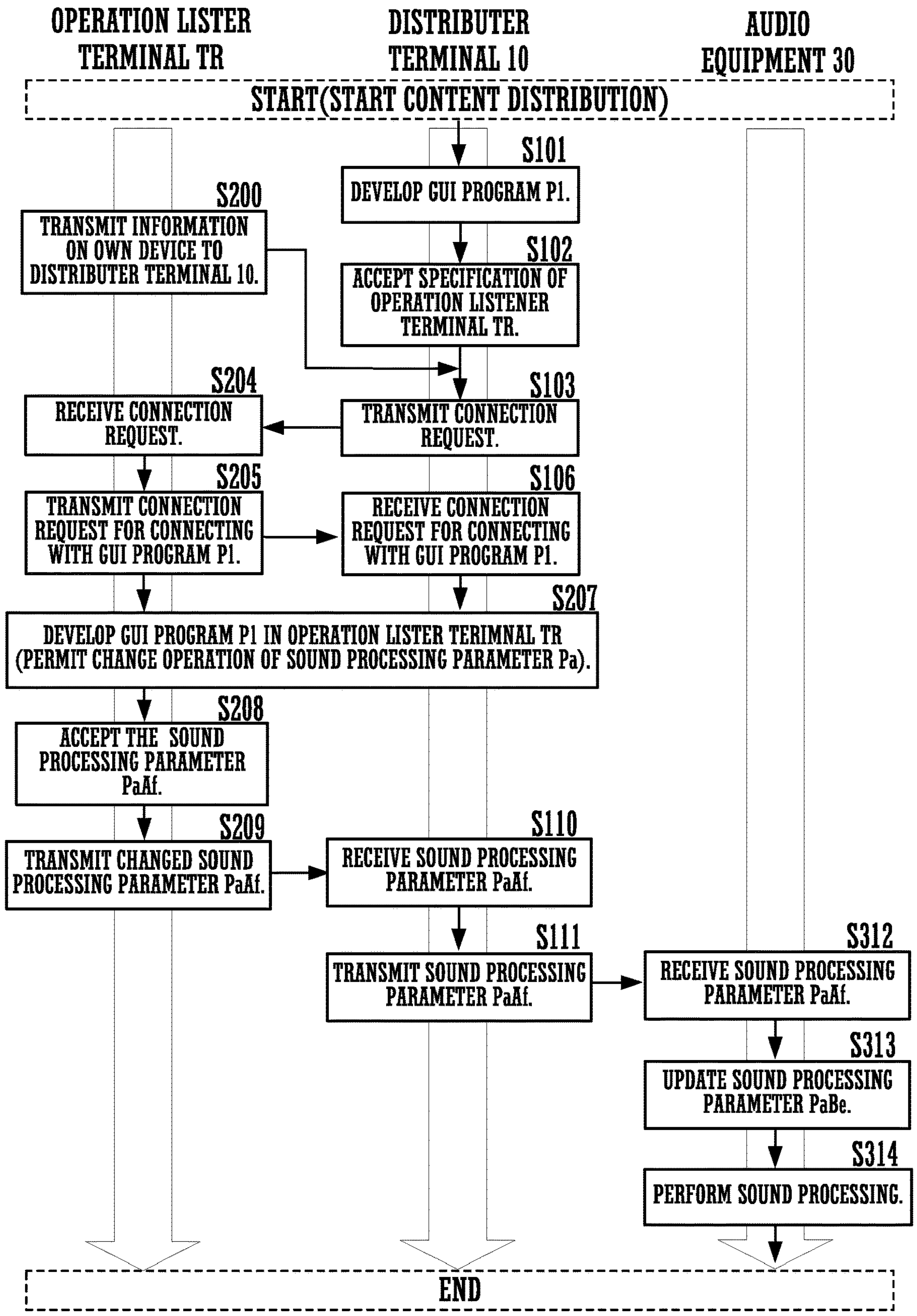
FIG. 5 is a flow chart exemplarily showing processing of the distributor terminal 10 when a GUI program P1 is used.

The processing as mentioned above is performed by using a GUI program, for example. Specifically, the flash memory 102 of the distributor terminal 10 stores a GUI program P1, as shown in FIG. 2. After that, the distributor terminal 10 and the operation listener terminal TR read out the GUI program P1 and develop it. In the present embodiment, the GUI program P1 is a Web application program, for example. Accordingly, the distributor terminal 10 and the operation listener terminal TR can operate the audio equipment 30 through a general-purpose web browser. Hereinafter, a series of processes will be described in detail with reference to the drawings. FIG. 5 is a flowchart exemplarily showing processing of the distributor terminal 10 when the GUI program P1 is used. In FIG. 5, start of processing (FIG. 5: START) corresponds to the time when the distributor terminal 10 starts content distribution.

First, the distributor terminal 10 develops the GUI program P1 in the distributor terminal 10 (FIG. 5: step S101). After the development, the distributor terminal 10 starts accepting specification of the operation listener terminal TR (FIG. 5: step S102). Thus, the distributor U can specify the operation listener terminal TR through the distributor terminal 10. In this case, the distributor terminal 10 specifies the operation listener terminal TR among the plurality of listener terminals 20 receiving the content distribution. Specifically, the listener terminal 20 is connected to the distributor terminal 10 serving as a distribution source. At this time, the listener terminal 20 transmits information on its own device to the distributor terminal 10, while receiving the content distribution from the distributor terminal 10 (FIG. 5: step S200). The distributor terminal 10 obtains the information on the listener terminal 20 receiving the content distribution. After that, the distributor terminal 10 displays the information on the listener terminal 20 through the GUI, for example. The distributor U specifies the operation listener terminal TR (operator LL) based on the information on the listener terminal 20. For instance, the information on the listener terminal 20 includes a handle name that is previously set in the listener terminal 20 by the listener L, or the like. In this case, the distributor terminal 10 displays a list of handle names on a display (not shown) included in the distributor terminal 10, for example. At this time, by selecting one handle name through the GUI, the distributor U specifies the operation listener terminal TR, for example. Thus, the distributor U can select the operator LL based on the handle name. Note that, the information on the listener terminal 20 is not limited to a handle name. The information on the listener terminal 20 may be an IP address, a MAC address, or the like of the listener terminal 20, for example.

The distributor terminal 10 transmits a connection request to the operation listener terminal TR after specifying the operation listener terminal TR (FIG. 5: step S103). The operation listener terminal TR receives the connection request (FIG. 5: step S204). The operation listener terminal TR transmits a connection request for connecting with the GUI program P1 to the distributor terminal 10 after receiving the connection request (FIG. 5: step S205). The distributor terminal 10 receives the connection request for connecting with the GUI program P1 (FIG. 5: step S106).

The distributor terminal 10 develops the GUI program P1 in the operation listener terminal TR after the step S106 (FIG. 5: step S207). This makes it possible for the operation listener terminal TR to change the sound processing parameter Pa through the GUI program P1.

After the step S207, the operation listener terminal TR accepts the sound processing parameter PaAf change by the operation listener terminal TR (FIG. 5: step S208). Thus, the operator LL can change the sound processing parameter Pa. After changing the sound processing parameter Pa, the operation listener terminal TR transmits a sound processing parameter PaAf to the distributor terminal 10 (FIG. 5: step S209). Specifically, the GUI program P1 executes an instruction that causes the operation listener terminal TR to transmit the sound processing parameter PaAf to the audio equipment 30. Accordingly, the operation listener terminal TR transmits the sound processing parameter PaAf to the distributor terminal 10.

After the step S209, the distributor terminal 10 receives the sound processing parameter PaAf (FIG. 5: step S110). After receiving the sound processing parameter PaAf, the distributor terminal 10 transmits the sound processing parameter PaAf to the audio equipment 30 (FIG. 5: step S111). Such development of the GUI program P1 or such transmission and reception of the sound processing parameter PaAf are performed by constructing a P2P (Peer To Peer) between the distributor terminal 10 and the operation listener terminal TR, for example. Thus, the operation listener terminal TR transmits the sound processing parameter PaAf to the distributor terminal 10 through the P2P.

After the step S111, the audio equipment 30 receives the sound processing parameter PaAf (FIG. 5: step S312). After the reception, the audio equipment 30 updates a value of the sound processing parameter PaBe, which is stored in the flash memory 302, to a value of the sound processing parameter PaAf (FIG. 5: step S313). After the updating, the audio equipment 30 performs sound processing based on the sound processing parameter PaAf (FIG. 5: step S314).

As mentioned above, the operation listener terminal TR can operate the audio equipment 30 through the GUI program P1. Note that, a method for the operation listener terminal TR to transmit the sound processing parameter Pa to the audio equipment 30 is not limited to the example in which the GUI program P1 is used. For instance, the operation listener terminal TR may operate the audio equipment 30 by operating the distributor terminal 10 remotely. For instance, the distributor terminal 10 develops a program for operating the audio equipment 30. After that, the operation listener terminal TR establishes a remote connection to the distributor terminal 10. For instance, a P2P is constructed between the distributor terminal 10 and the operation listener terminal TR to establish the remote connection. After that, the operation listener terminal TR operates the distributor terminal 10 through the P2P. Thus, the operation listener terminal TR can operate the audio equipment 30 through the distributor terminal 10.

Effect of First Embodiment

According to the distributor terminal 10, the distributor U can cause the listener L to control an operation of the audio equipment 30 remotely at the timing when the distributor U desires. In more detail, the distributor terminal 10 is used by the content distributor U. The distributor terminal 10 communicates with the audio equipment 30 that performs sound processing related to content. The distributor terminal 10 distributes the content to one or more listener terminals 20. The distributor terminal 10 specifies an operation listener terminal TR that is permitted to change the sound processing parameter Pa of the audio equipment 30, among the one or more listener terminals 20. The operation listener terminal TR accepts a change of the sound processing parameter Pa from the listener L. The operation listener terminal TR transmits the sound processing parameter PaAf to the audio equipment 30 through the distributor terminal 10. After that, the audio equipment 30 performs sound processing based on the sound processing parameter Pa received from the operation listener terminal TR. With the above-mentioned configuration, the distributor U can transfer operation authority of the audio equipment 30 to the listener L through the distributor terminal 10 at the timing when the distributor U desires. After that, the listener L to whom the authority is transferred performs an operation of the audio equipment 30. As a result, the distributor U can cause the listener L to control an operation of the audio equipment 30 remotely at the timing when the distributor U desires. The distributor U can concentrate on distribution, without being necessary to pay attention to the operation of the audio equipment 30. Further, if the distributor U transfers the operation authority to a listener L who is experienced in an operation of the audio equipment 30, the content will be distributed with more suitable acoustic setting.

Furthermore, according to the above-mentioned configuration, the listener L (i.e., operator LL) receiving content distribution, rather than the distributor U, operates the audio equipment 30 while hearing sounds of the distributed content. Accordingly, in the present embodiment, the operator LL operating the audio equipment 30 can perform sound processing (sound processing related to the content) under the same condition and environment as the other listeners receiving the content distribution.

Second Embodiment

Figure 6:
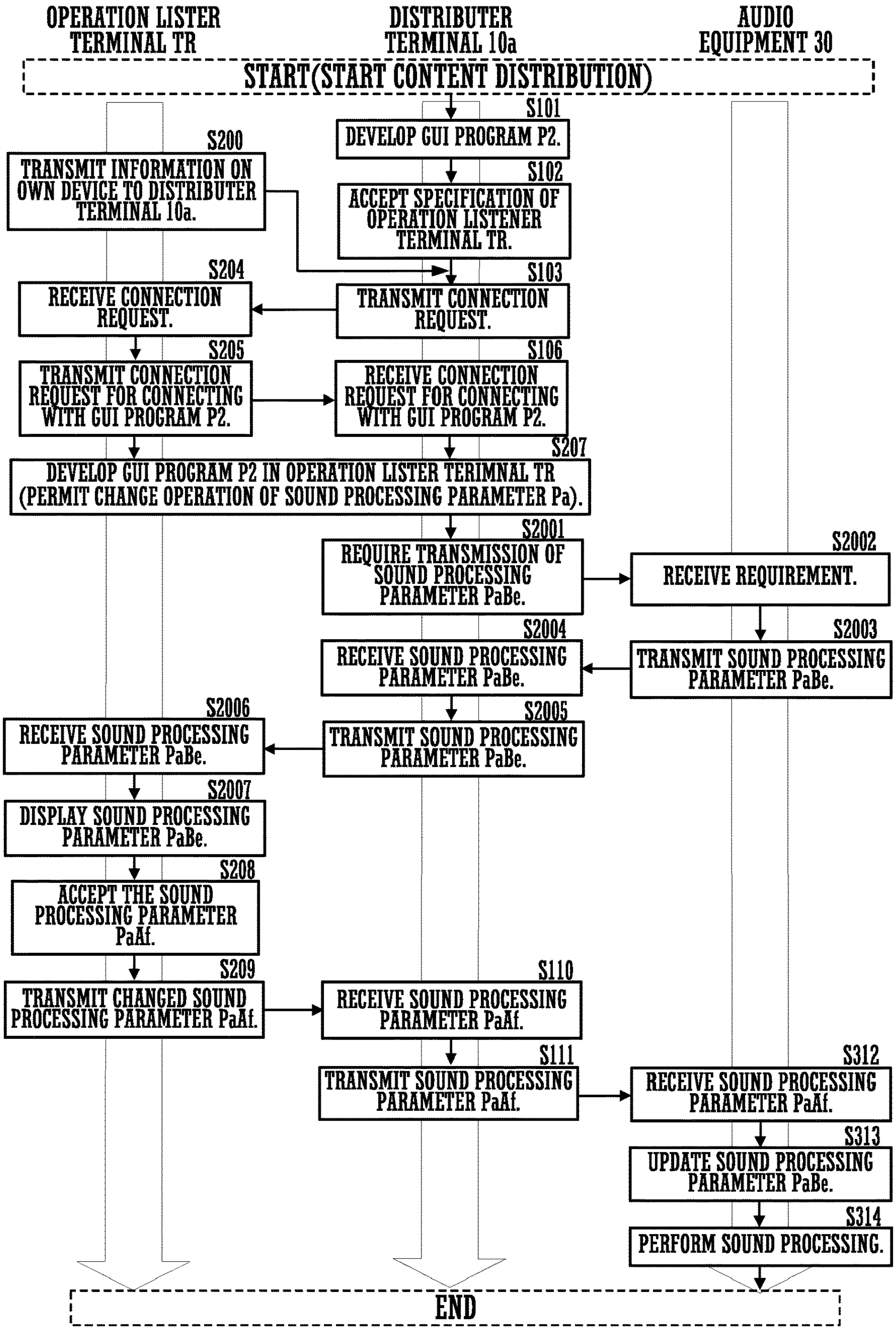
FIG. 6 is a flow chart exemplarily showing processing of a distributor terminal 10*a* when a GUI program P2 is used.

Hereinafter, a distributor terminal 10*a* in accordance with a second embodiment will be described with reference to the drawings. FIG. 6 is a flowchart exemplarily showing processing of the distributor terminal 10*a* when a GUI program P2 is used.

The distributor terminal 10*a* is different from the distributor terminal 10 in that the sound processing parameter Pa, which is set in the audio equipment 30, is displayed on the operation listener terminal TR. Specifically, the operation listener terminal TR includes a display TRD. In the present embodiment, the display TRD corresponds to a listener display. After specifying the operation listener terminal TR, the distributor terminal 10*a* displays information related to the sound processing parameter PaBe on the display TRD. To perform such processing, the distributor terminal 10*b* and the operation listener terminal TR read out the GUI program P2 and develop it, for example (see FIG. 6).

Hereinafter, the details thereof will be described. After specifying the operation listener terminal TR, the distributor terminal 10*a* obtains the sound processing parameter PaBe, which is set in the audio equipment 30, from the audio equipment 30. Specifically, after the step S207, the distributor terminal 10*a* requires the audio equipment 30 to transmit the sound processing parameter PaBe (FIG. 6: step S2001). Next, the audio equipment 30 receives the requirement of transmitting the sound processing parameter PaBe (FIG. 6: step S2002). Subsequently, the audio equipment 30 transmits the sound processing parameter PaBe, which is stored in the audio equipment 30, to the distributor terminal 10*a* (FIG. 6: step S2003). The distributor terminal 10*a* receives the sound processing parameter PaBe (FIG. 6: step S2004).

After that, the distributor terminal 10*a* transmits the sound processing parameter PaBe, which is set in the audio equipment 30, to the operation listener terminal TR (FIG. 6: step S2005).

After the operation listener terminal TR receives the sound processing parameter PaBe (FIG. 6: Step S2006), the display TRD displays the received sound processing parameter PaBe set in the audio equipment 30 (FIG. 6: step S2007). For instance, if gain=10 dB is set in the audio equipment 30 as a value of the sound processing parameter PaBe, the operation listener terminal TR obtains a parameter of gain=10 dB. The GUI program P2 causes the display TRD to display information indicating gain=10 dB. For instance, the GUI program P2 displays a text message of "gain=10 dB" on the display TRD.

After the process of the step S2007, the distributor terminal 10*a*, the operation listener terminal TR, and the audio equipment 30 perform processes from the step S208 to the step S314.

Note that, a method for the distributor terminal 10*a* to cause the operation listener terminal TR to display the sound processing parameter PaBe is not limited to only the method performed by using the GUI program P2.

Effect of Second Embodiment

According to the distributor terminal 10*a*, the operator LL can easily adjust the sound processing parameter Pa. Specifically, the distributor terminal 10*a* obtains the sound processing parameter PaBe, which is set in the audio equipment 30, from the audio equipment 30. The distributor terminal 10*a* transmits the sound processing parameter PaBe, which is set in the audio equipment 30, to the operation listener terminal TR. The operation listener terminal TR displays the received sound processing parameter PaBe set in the audio equipment 30. With the above-mentioned configuration, the operator LL can know a value of the sound processing parameter PaBe, or the like before changing the sound processing parameter Pa. Accordingly, the operator LL can determine an adjustment amount of the sound processing parameter Pa based on a value of the sound processing parameter PaBe, or the like. Accordingly, the operator LL can adjust the sound processing parameter Pa correctly.

Third Embodiment

Figure 7:
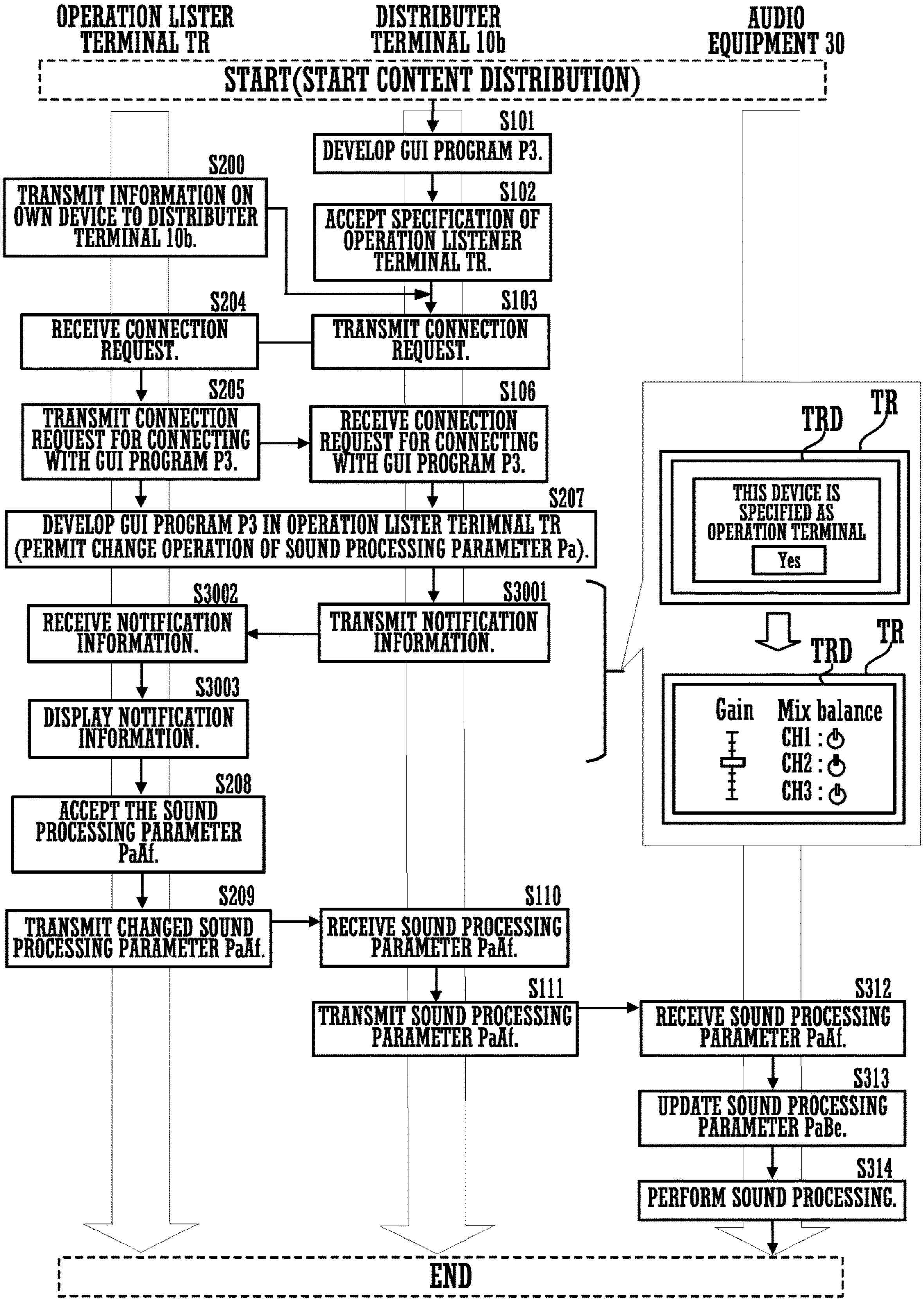
FIG. 7 is a flow chart exemplarily showing processing of a distributor terminal 10*b* when a GUI program P3 is used.

Hereinafter, a distributor terminal 10*b* in accordance with a third embodiment will be described with reference to the drawings. FIG. 7 is a flowchart exemplarily showing processing of the distributor terminal 10*b* when a GUI program P3 is used.

The distributor terminal 10*b* is different from the distributor terminal 10 in that notification information is transmitted to the operation listener terminal TR. The notification information is information indicating that the listener terminal 20 is specified as the operation listener terminal TR. To perform such processing, the distributor terminal 10*b* and the operation listener terminal TR read out the GUI program P3 and develop it, for example (see FIG. 7). Hereinafter, the details thereof will be described.

When the distributor terminal 10*b* specifies the operation listener terminal TR, the distributor terminal 10*b* transmits the notification information to the operation listener terminal TR. Specifically, after developing the GUI program P3 (FIG. 7: after step S207), the distributor terminal 10 transmits the notification information to the operation listener terminal TR (FIG. 7: step S3001). Subsequently, the operation listener terminal TR receives the notification information (FIG. 7: step S3002). After that, the operation listener terminal TR displays information that is based on the notification information (FIG. 7: step S3003). Specifically, in the present embodiment, the operation listener terminal TR is provided with a display TRD, as shown in FIG. 7. The display TRD displays the information that is based on the notification information. For instance, the distributor terminal 10*b* transmits a text message of "this device is specified as an operation terminal" to the operation listener terminal TR. When the operation listener terminal TR receives the text message, the display TRD displays the message of "this device is specified as an operation terminal."

After display of the notification information (FIG. 7: after the step S3003), the distributor terminal 10*b*, the operation listener terminal TR, and the audio equipment 30 perform processes from the step S208 to the step S314 (see FIG. 7).

Note that, a method for the distributor terminal 10*b* to cause the operation listener terminal TR to display information that is based on the notification information is not limited to only the method performed by using the GUI program P3.

Effect of Third Embodiment

According to the distributor terminal 10*b*, it is correctly notified that the listener L is selected as the operator LL. Specifically, when the distributor terminal 10*b* specifies the operation listener terminal TR, the notification information, which indicates that the operation listener terminal TR is specified, is transmitted to the operation listener terminal TR. After that, the display TRD of the operation listener terminal TR displays information that is based on the notification information. For instance, assuming the case where the GUI program P3 or the like is used, when a display of the display TRD is changed, a screen display of the terminal, which is used by the listener L selected as the operator LL, is changed. At this time, the operator LL is likely to be confused due to the change of the screen display. In the configuration of the present embodiment, after the listener L is notified of being selected as the operator LL, a screen display of the terminal used by the operator LL is changed. Accordingly, even if a display of the display TRD is changed by the GUI program P3, the operator LL is less likely to be confused, for example.

Fourth Embodiment

Figure 8:
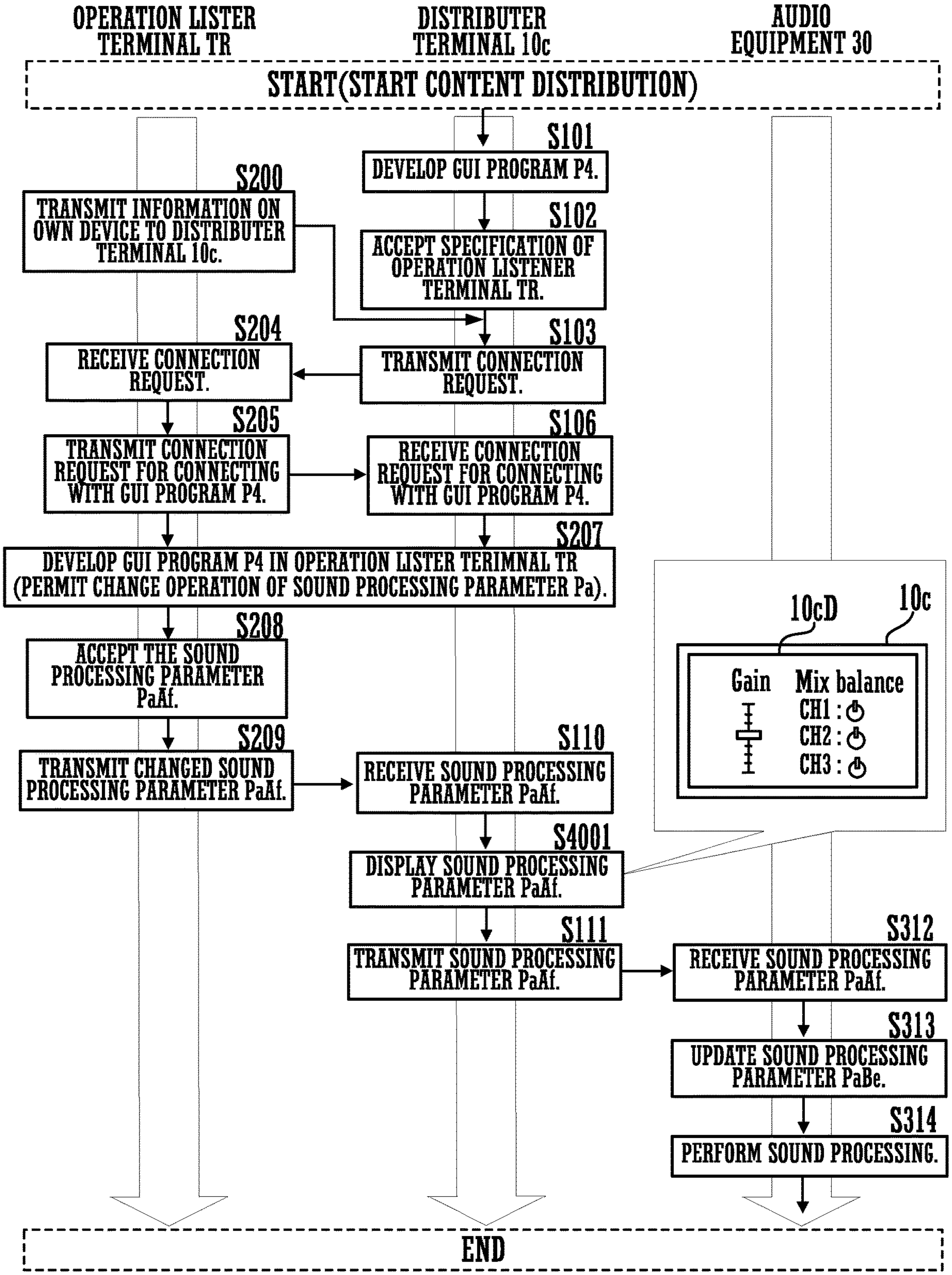
FIG. 8 is a flow chart exemplarily showing processing of a distributor terminal 10*c* when a GUI program P4 is used.

Hereinafter, a distributor terminal 10*c* in accordance with a fourth embodiment will be described with reference to the drawings. FIG. 8 is a flowchart exemplarily showing processing of the distributor terminal 10*c* when a GUI program P4 is used.

The distributor terminal 10*c* is different from the distributor terminal 10 in that the sound processing parameter PaAf after being changed by the operator LL is displayed. Specifically, the distributor terminal 10*c* includes a display 10*c*D, as shown in FIG. 8. The display 10*c*D displays the sound processing parameter PaAf after being changed by the operation listener terminal TR. In more detail, after the step S110 (FIG. 8: step S110), the display 10*c*D displays the sound processing parameter PaAf (FIG. 8: step S4001). In the example shown in FIG. 8, the display 10*c*D displays a fader and a knob as the GUI. In FIG. 8, the fader indicates a value of gain, and the knob indicates an adjustment value of mix balance. In other words, in the example shown in FIG. 8, the fader and the knob are displayed based on the value of the sound processing parameter PaAf. In the present embodiment, the display 10*c*D corresponds to a distributor display.

After the distributor terminal 10*c* displays the sound processing parameter PaAf (FIG. 8: after step S4001), the distributor terminal 10*c* and the audio equipment 30 perform processes from the step S111 to the step S314 (see FIG. 8).

To perform the processing as mentioned above, the distributor terminal 10*c* and the operation listener terminal TR read out the GUI program P4 and develop it, for example (see FIG. 8). Note that, a method for the distributor terminal 10*c* to display the sound processing parameter PaAf is not limited to only the method performed by using the GUI program P4.

Effect of Fourth Embodiment

According to the distributor terminal 10*c*, the distributor U can check the changed sound processing parameter PaAf. In more detail, the distributor terminal 10*c* is provided with a display 10*c*D. The display 10*c*D displays the sound processing parameter PaAf after being changed by the operation listener terminal TR. Thus, the distributor U can check what sound processing parameter PaAf is used for outputting the sounds through the audio equipment 30. This makes it possible to check whether the value of the sound processing parameter PaAf is a distributor's U desired value or not, for example.

Fifth Embodiment

Figure 9:
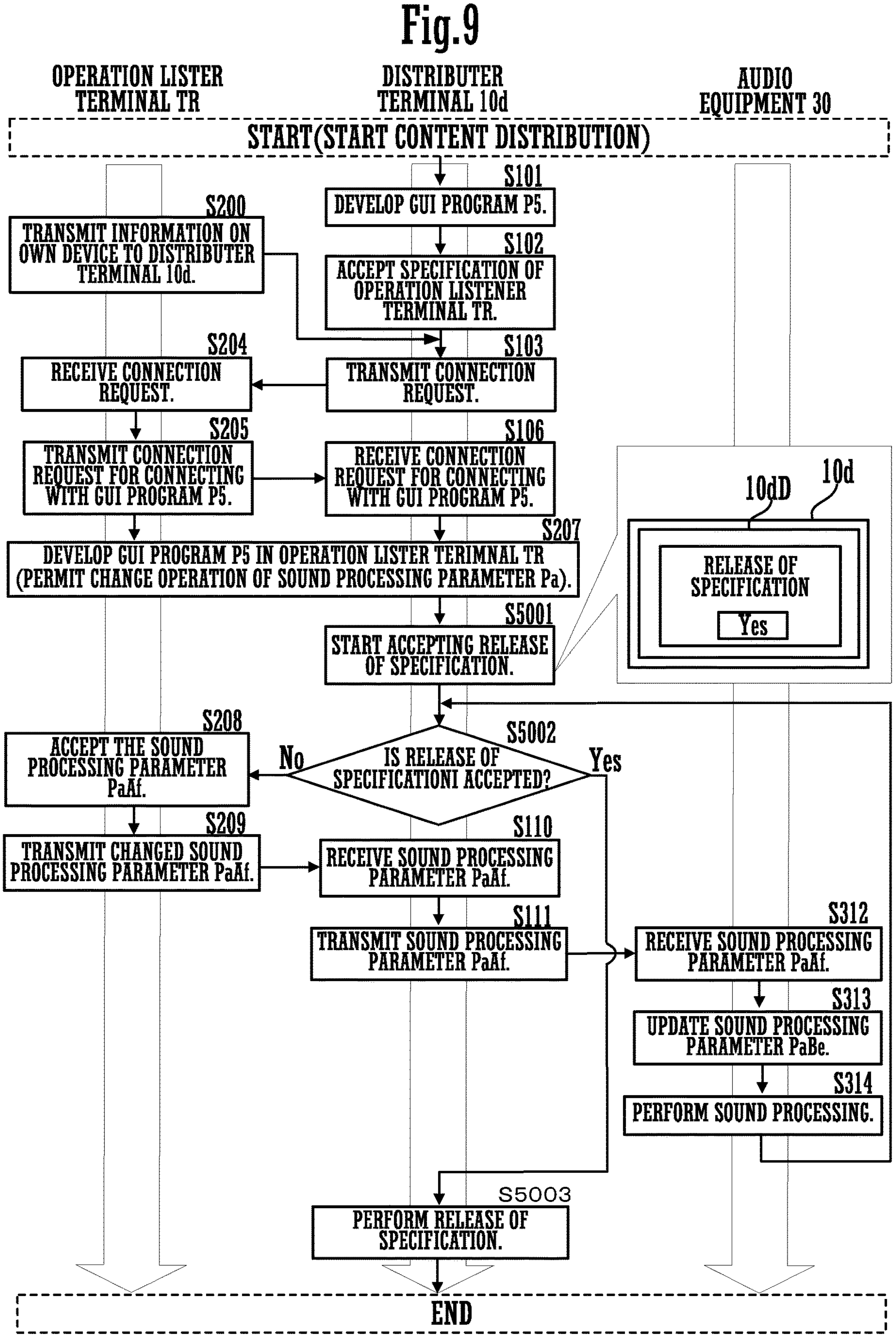
FIG. 9 is a flow chart exemplarily showing processing of a distributor terminal 10*d* when a GUI program P5 is used.

Hereinafter, a distributor terminal 10*d* in accordance with a fifth embodiment will be described with reference to the drawings. FIG. 9 is a flowchart exemplarily showing processing of the distributor terminal 10*d* when a GUI program P5 is used.

The distributor terminal 10*d* is different from the distributor terminal 10 in that the distributor terminal 10*d* can stop an operation of the audio equipment 30 by the operation listener terminal TR. Specifically, after specifying the operation listener terminal TR, the distributor terminal 10 accepts release of the operation listener terminal TR, as shown in FIG. 9. In more detail, after the operation listener terminal TR develops the GUI program P5 (FIG. 9: after step S207), the distributor terminal 10*d* starts accepting release of specification of the operation listener terminal TR (FIG. 9: step S5001). When accepting release of the operation listener terminal TR (FIG. 9: step S5002), the distributor terminal 10*d* releases the specification of the operation listener terminal TR (FIG. 9: step S5003). For instance, the distributor terminal 10*d* displays a button for accepting release of the specification on a display 10*d*D of the distributor terminal 10*d* (see FIG. 9). The distributor U presses the button by clicking thereon or the like. The GUI program P5 determines whether the distributor U presses the button or not. When the GUI program P5 determines that the button is pressed, the GUI program P5 disconnects communication for operating the audio equipment 30 with the operation listener terminal TR, for example. This stops the operation of the audio equipment 30 by the operation listener terminal TR. Note that, a method to stop an operation of the audio equipment 30 by the operation listener terminal TR is not limited to only the method performed by disconnecting the communication.

If the distributor terminal 10*d* does not accept release of the specification (FIG. 9: step S5002), the distributor terminal 10*d*, the operation listener terminal TR, and the audio equipment 30 will repeat processes from the step S208 to the step S314.

Note that, a method for the distributor terminal 10*d* to stop an operation of the audio equipment 30 by the operation listener terminal TR is not limited to only the method performed by using the GUI program P5.

Effect of Fifth Embodiment

According to the distributor terminal 10*d*, the distributor U can transfer operation authority of the sound processing parameter PaAf to the operator LL, only when necessary. In more detail, after specifying the operation listener terminal TR, the distributor terminal 10*d* accepts release of the operation listener terminal TR that has been specified. When release of the operation listener terminal is accepted, the distributor terminal 10*d* releases the operation listener terminal TR that has been specified. In the above-mentioned configuration, if determining that it is unnecessary for the operator LL to operate the audio equipment 30, the distributor U can stop an operation of the audio equipment 30 by the operator LL.

Sixth Embodiment

Figure 10:
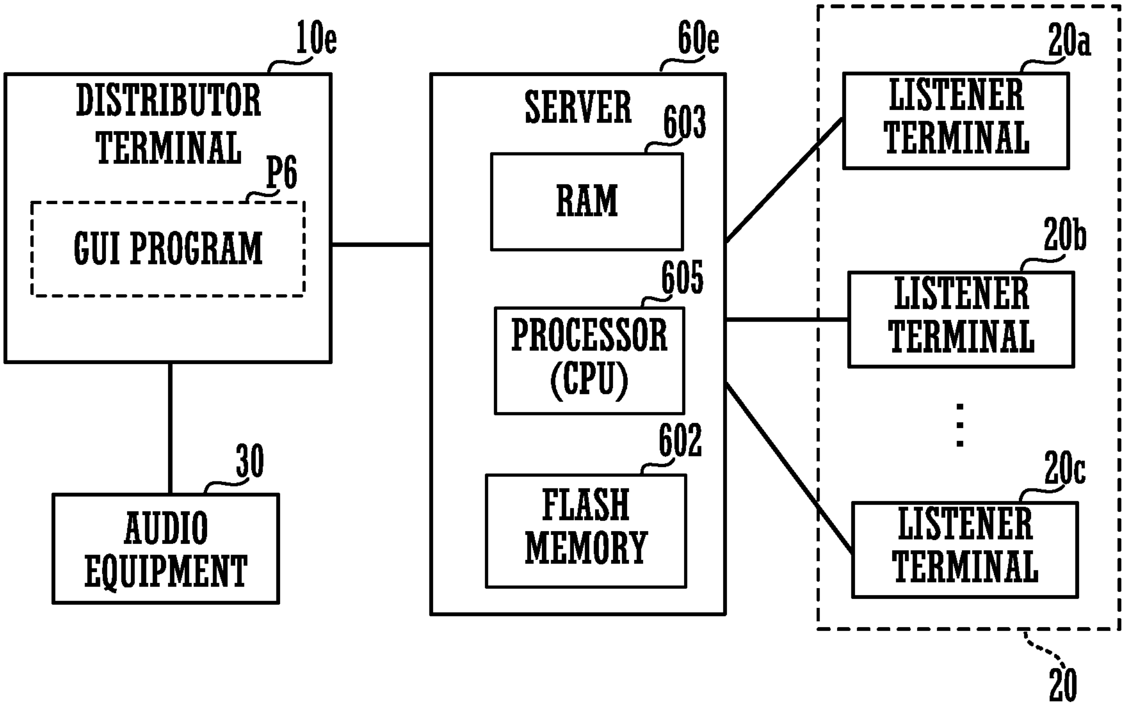
FIG. 10 is a block diagram exemplarily showing a connection between a distributor terminal 10*e*, the listener terminal 20, and a server 60*e*.
Figure 11:
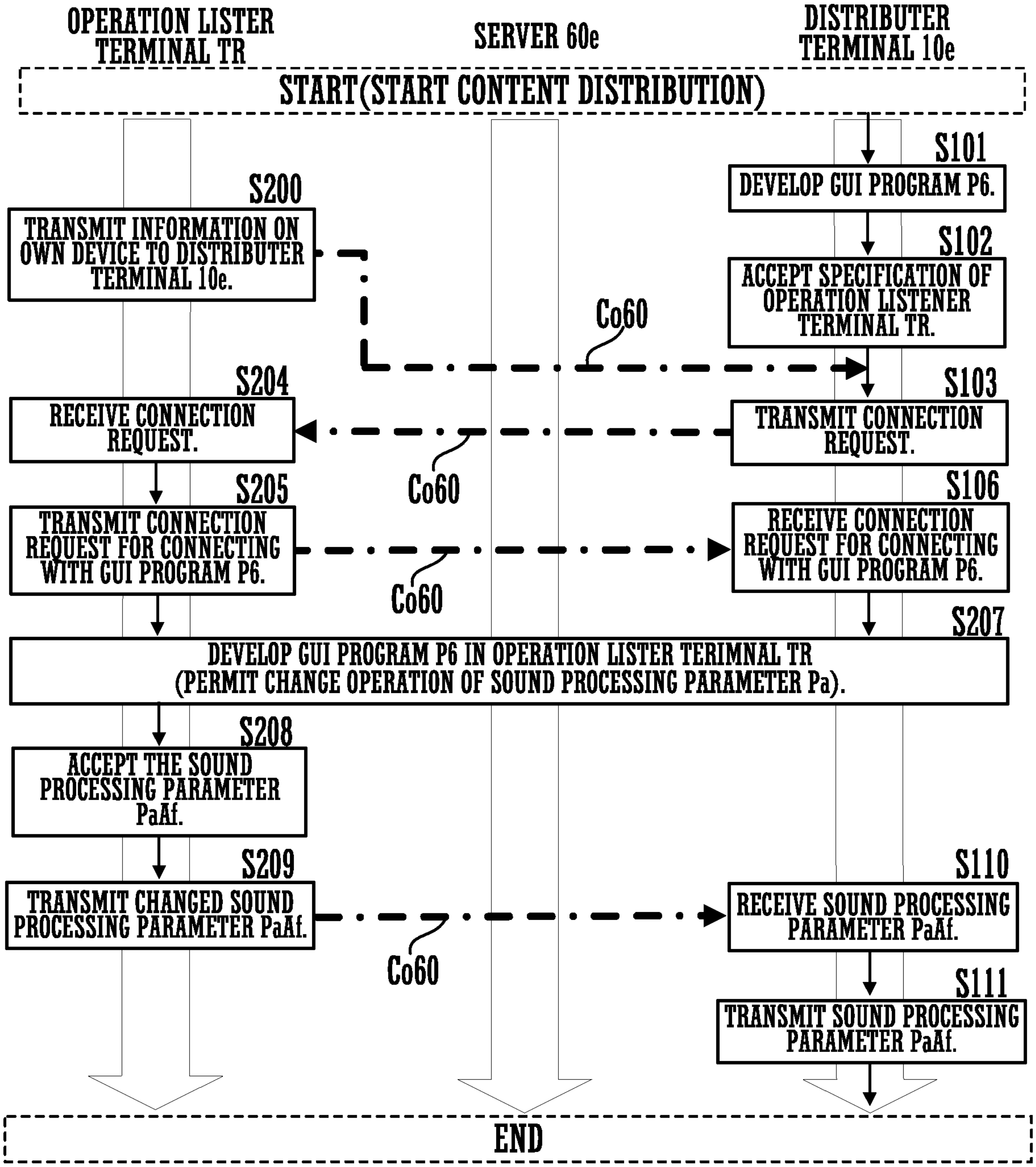
FIG. 11 is a flow chart exemplarily showing processing of the distributor terminal 10*e* when a GUI program P6 is used.

Hereinafter, a distributor terminal 10*e* in accordance with a sixth embodiment will be described with reference to the drawings. FIG. 10 is a block diagram exemplarily showing a connection between the distributor terminal 10*e*, the listener terminal 20, and a server 60*e*. FIG. 11 is a flowchart exemplarily showing processing of the distributor terminal 10*e* when a GUI program P6 is used. In FIG. 11, dotted line arrows each indicate communication through the server 60*e*. Hereinafter, the communication through the server 60*e* is referred to as communication Co60.

The distributor terminal 10*e* is different from the distributor terminal 10 in that content distribution is performed through one or more listener terminals 20 and the server 60*e*. Hereinafter, the details thereof will be described.

As shown in FIG. 10, the server 60*e* is provided with a flash memory 602, a RAM 603, and a processor 605. The processor 605 reads out a predetermined program, which is stored in the flash memory 602, to the RAM 303 and performs various kinds of operations. As shown in FIG. 10, the distributor terminal 10*e* is connected to the server 60*e*. The listener terminal 20 is connected to the server 60*e*. The server 60*e* stores information related to communication between the distributor terminal 10*e* and the listener terminal 20. The information related to the communication is routing information or the like, for example. Thus, the distributor terminal 10*e* transmits a sound signal, which is inputted from the audio equipment 30 through the server 60*e*, to the listener terminal 20.

First, the distributor terminal 10*e* distributes the content to the one or more listener terminals 20 through a server 60*e* (FIG. 11: START). Next, as shown in FIG. 11, the operation listener terminal TR transmits information on its own device to the distributor terminal 10 through the communication Co60 (FIG. 11: step S200). Further, the distributor terminal 10*e* transmits a connection request to the operation listener terminal TR through the communication Co60 (FIG. 11: step S103). Further, the operation listener terminal TR transmits a connection request for connecting with the GUI program P6 to the distributor terminal 10*e* through the communication Co60 (FIG. 11: step S205). In other words, in specification of the operation listener terminal TR, the distributor terminal 10*e* specifies the operation listener terminal TR, which operates a change of the sound processing parameter Pa of the audio equipment 30, among the one or more listener terminals 20 through the server 60*e*. Further, the operation listener terminal TR transmits the sound processing parameter PaAf to the distributor terminal 10*e* through the communication Co60 (FIG. 11: step S209). In other words, in transmission of the changed sound processing parameter PaAf to the audio equipment 30, the operation listener terminal TR transmits the changed sound processing parameter PaAf to the audio equipment 30 through the server 60*e*.

Effect of Sixth Embodiment

According to the distributor terminal 10*e* and the server 60*e*, processing speed of the distributor terminal 10*e* is improved. Specifically, the distributor terminal 10*e* distributes content to one or more listener terminals 20 through the server 60*e*. The distributor terminal 10*e* specifies the operation listener terminal TR, which operates a change of the sound processing parameter Pa of the audio equipment 30, among the one or more listener terminals 20 through the server 60*e*. The operation listener terminal TR transmits the changed sound processing parameter Pa to the audio equipment 30 through the server 60*e*. With the above-mentioned configuration, the server 60*e* performs processing related to communication between the distributor terminal 10*e* and the listener terminal 20. For instance, the processing related to the communication is routing processing between the distributor terminal 10*e* and the listener terminal 20, or the like. This makes it unnecessary for the distributor terminal 10*e* to perform processing related to communication with the listener terminal 20. Accordingly, the number of processes parallelly executed in the distributor terminal 10*e* can be reduced. As a result, this improves the processing speed of the distributor terminal 10*e*.

First Modification of Sixth Embodiment

Figure 12:
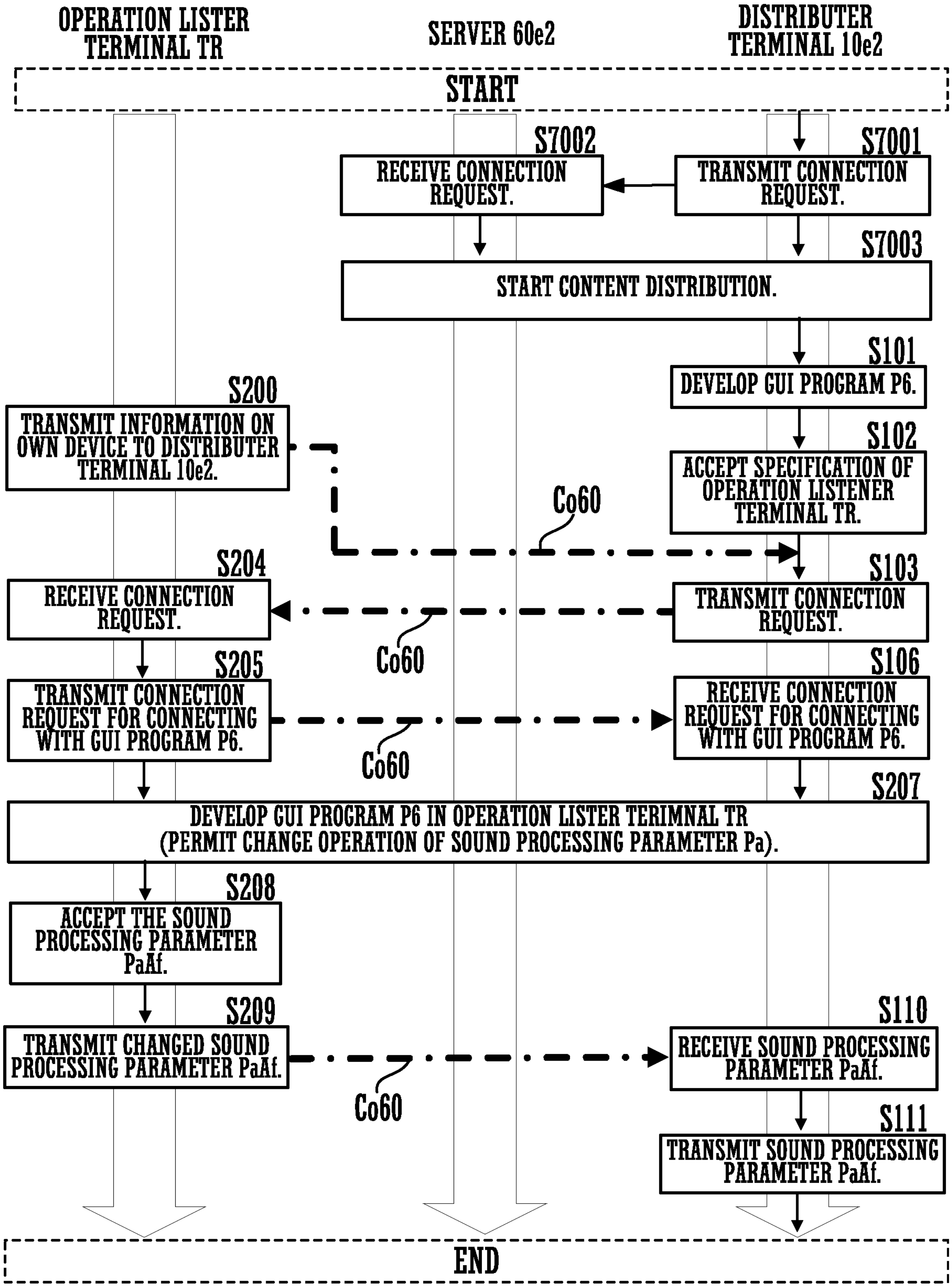
FIG. 12 is a flow chart exemplarily showing communication between a distributor terminal 10*e*2, a server 60*e*2, and the operation listener terminal TR in accordance with a first modification of a sixth embodiment.

Hereinafter, a distributor terminal 10*e*2 and a server 60*e*2 in accordance with a first modification of the sixth embodiment will be described with reference to FIG. 12. FIG. 12 is a flowchart exemplarily showing communication between the distributor terminal 10*e*2, the server 60*e*2, and the operation listener terminal TR in accordance with the first modification of the sixth embodiment.

In the present modification, the server 60*e*2 is a distribution server that distributes content to one or more listener terminals 20. In other words, the server 60*e*2 performs processing related to content distribution, instead of the distributor terminal 10*e*2. Accordingly, the server 60*e*2 stores a program related to content distribution or the like. On the other hand, the distributor terminal 10*e*2 is not required to store the program related to content distribution or the like. Hereinafter, a flow of the processing will be described in detail.

As shown in FIG. 12, the distributor terminal 10*e*2 transmits a connection request to the server 60*e*2 (FIG. 12: step S7001). The server 60*e*2 receives the connection request (FIG. 12: step S7002). After receiving the connection request, the server 60*e*2 develops the program related to content distribution. After the development, content distribution is started by the distributor terminal 10*e*2 and the server 60*e*2 (FIG. 12: step S7003). Since the processing after the start of content distribution is the same as the processing described in the sixth embodiment, the description thereof is omitted.

Effect of First Modification of Sixth Embodiment

According to the distributor terminal 10*e*2 and the server 60*e*2, processing speed of the distributor terminal 10*e*2 is improved. Specifically, the server 60*e*2 is a distribution server that distributes content to one or more listener terminals 20. In the above-mentioned configuration, the server 60*e*2 performs processing related to content distribution, in addition to the processing related to communication between the distributor terminal 10*e* and the listener terminal 20. This makes it unnecessary for the distributor terminal 10*e*2 to perform the processing related to content distribution. Thus, the number of processes parallelly executed in the distributor terminal 10*e*2 can be reduced. As a result, this improves the processing speed of the distributor terminal 10*e*2.

Second Modification of Sixth Embodiment

Figure 13:
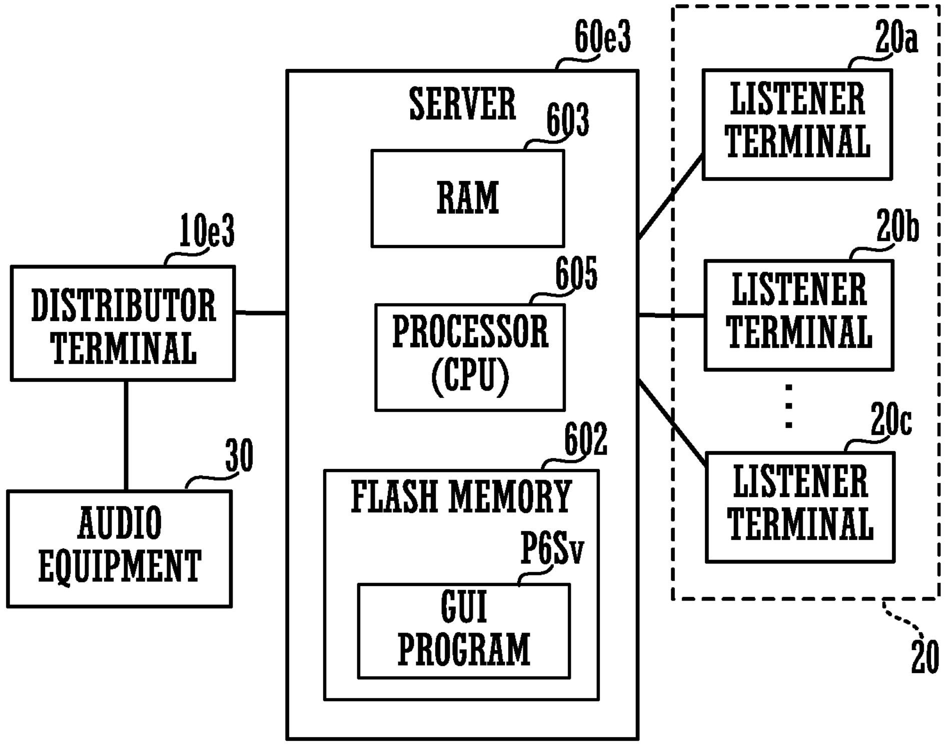
FIG. 13 is a block diagram exemplarily showing a connection between a distributor terminal 10*e*3, a server 60*e*3, and the listener terminal 20 in accordance with a second modification of the sixth embodiment.
Figure 14:
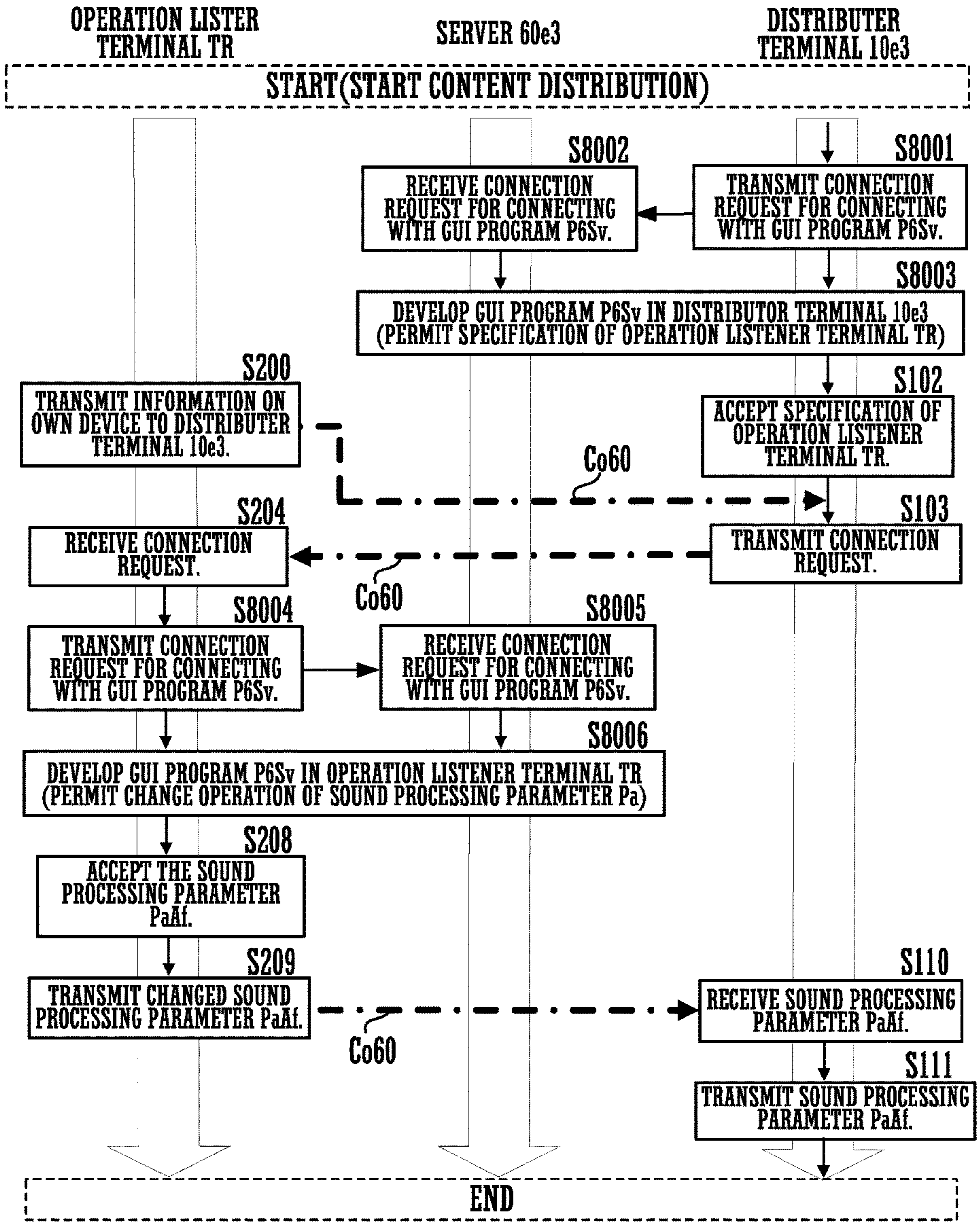
FIG. 14 is a flow chart exemplarily showing communication between the distributor terminal 10*e*3, the server 60*e*3, and the operation listener terminal TR in accordance with the second modification of the sixth embodiment.
Figure 15:
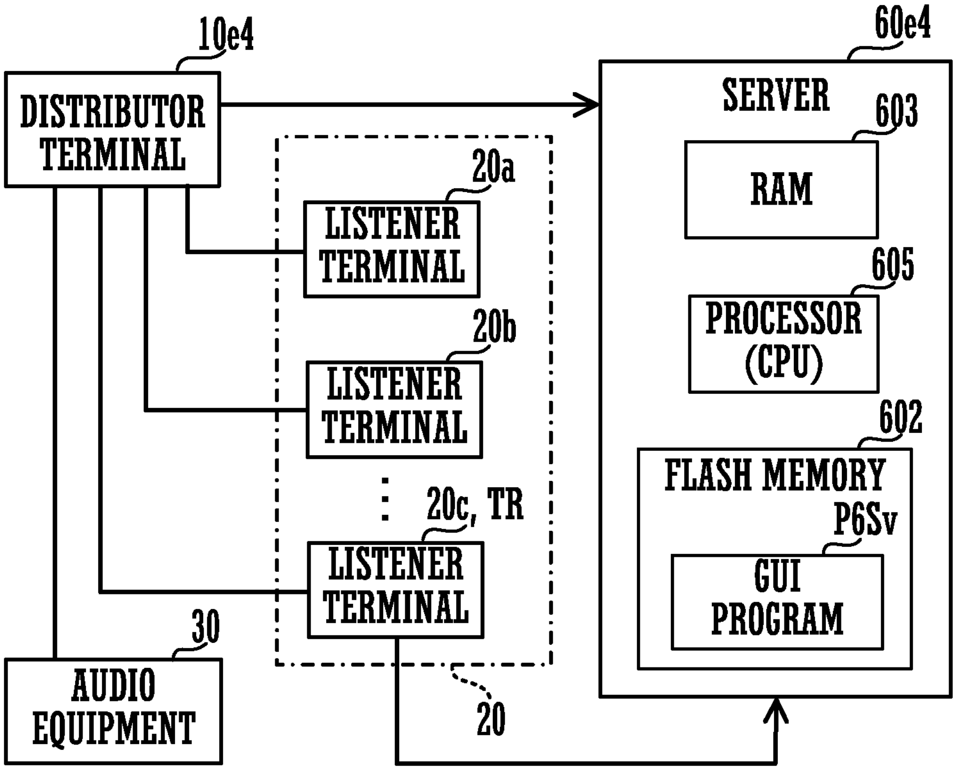
FIG. 15 is a block diagram exemplarily showing a connection between a distributor terminal 10*e*4, a server 60*e*4, and the operation listener terminal TR in accordance with the second modification of the sixth embodiment.

Hereinafter, distributor terminals 10*e*3 and 10*e*4 and servers 60*e*3 and 60*e*4 in accordance with a second modification of the sixth embodiment will be described with reference to the drawings. FIG. 13 is a block diagram exemplarily showing a connection between the distributor terminal 10*e*3, the server 60*e*3, and the listener terminal 20 in accordance with the second modification of the sixth embodiment. FIG. 14 is a flowchart exemplarily showing communication between the distributor terminal 10*e*3, the server 60*e*3, and the operation listener terminal TR in accordance with the second modification of the sixth embodiment. FIG. 15 is a block diagram exemplarily showing a connection between the distributor terminal 10*e*4, the server 60*e*4, and the operation listener terminal TR in accordance with the second modification of the sixth embodiment.

In the present modification, the server 60*e*3 stores a GUI program P6Sv, instead of the distributor terminal 10*e*3, as shown in FIG. 13. Specifically, a flash memory 602 of the server 60*e*3 stores the GUI program P6Sv. The distributor terminal 10*e*3 reads out the GUI program P6Sv from the server 60*e*3. Specifically, the distributor terminal 10*e*3 transmits a connection request for connecting with the GUI program P6Sv to the server 60*e*3 (FIG. 14: step S8001). The server 60*e*3 receives the connection request for connecting with the GUI program P6Sv (FIG. 14: step S8002). The server 60*e*3 develops the GUI program P6Sv in the distributor terminal 10*e*3 (FIG. 14: step S8003).

Further, the operation listener terminal TR reads out the GUI program P6Sv from the server 60*e*3. Specifically, the operation listener terminal TR transmits a connection request for connecting with the GUI program P6Sv to the server 60*e*3 (FIG. 14: step S8004). The server 60*e*3 receives the connection request for connecting with the GUI program P6Sv (FIG. 14: step S8005). The server 60*e*3 develops the GUI program P6Sv in the operation listener terminal TR (FIG. 14: step S8006).

Since processing except for the read-out of the GUI program P6Sv from the server 60*e*3 is the same as the processing described in the sixth embodiment, the description thereof is omitted.

Note that, as shown in FIG. 15, it is not necessary to connect the distributor terminal 10*e*4 and the listener terminal 20 through the server 60*e*4. In this case, the server 60*e*4 performs only development of the GUI program P6Sv in the distributor terminal 10*e*4 and development of the GUI program P6Sv in the operation listener terminal TR.

Note that, the distributor terminal 10*e*3 may specify the operation listener terminal TR using a password, for example. For instance, the distributor U sets a password with respect to the server 60*e*3 through the distributor terminal 10*e*3. When the operation listener terminal TR transmits a connection request for connecting with the GUI program P6Sv to the server 60*e*3, the server 60*e*3 requires the operation listener terminal TR to transmit the password. When the password is inputted, the server 60*e*3 develops the GUI program P6Sv in the operation listener terminal TR. In this case, the password may be transmitted to the operation listener terminal TR from the distributor terminal 10*e*3, using text messages or the like, for example.

First Modification of First Through Sixth Embodiments

Hereinafter, a distributor terminal 10*f* (not shown) in accordance with a first modification will be described. The distributor terminal 10*f* is different from the distributor terminal 10 in that the distributor terminal 10*f* develops a preview function to the operation listener terminal TR. The preview function can simulate a result of the sound processing to be performed based on a sound processing parameter PaAf, before the sound processing parameter PaAf is transmitted to the audio equipment 30. Therefore, before the sound processing parameter PaAf is transmitted, the operator LL can hear sounds obtained by simulating the sounds to be outputted from the audio equipment 30. Accordingly, the operator LL can adjust the sound processing parameter Pa more correctly.

Second Modification of First Through Sixth Embodiments

Hereinafter, a distributor terminal 10*g* (not shown) in accordance with a second modification will be described. The distributor terminal 10*g* is different from the distributor terminal 10 in that the distributor terminal 10*g* can transfer operation authority of the audio equipment 30 to each of a plurality of listeners L. Hereinafter, the details thereof will be described with reference to FIG. 4. For instance, the distributor terminal 10*g* can transfer operation authority related to gain adjustment to the listener Lb. Similarly, the distributor terminal 10*g* can transfer operation authority related to adjustment of mix balance to the listeners Lc. The audio equipment 30 performs sound processing based on a parameter inputted from each of the listener terminal 20*b* and the listener terminal 20*c*. Thus, the operator LL can adjust the sound processing parameter Pa in a shared manner.

Third Modification of First Through Sixth Embodiments

Hereinafter, a distributor terminal 10*h* (not shown) in accordance with a third modification will be described. The distributor terminal 10*h* is different from the distributor terminal 10 in that operation authority of another equipment, other than the audio equipment, can be transferred to the listener L. The distributor terminal 10*h* is used for distributing image content, for example. In this case, the distributor terminal 10*h* is connected to visual equipment. The distributor terminal 10*h* can transfer operation authority of the visual equipment to the listener L. Such visual equipment is a video switcher or the like, for example. In this case, operation authority of image switching is transferred to the operation listener terminal TR, for example. Note that, the distributor terminal 10*h* may transfer operation authority of illumination to the listener L, instead of the operation authority of visual equipment, for example. In this case, the distributor terminal 10*h* is connected to a dimmer. The distributor terminal 10*h* can transfer operation authority of the dimmer to the listener L. In this case, operation authority of light intensity, turning-on/off of the illumination, and the like are transferred to the operation listener terminal TR, for example.

Fourth Modification of First Through Sixth Embodiments

Hereinafter, a distributor terminal 10*i* (not shown) in accordance with a fourth modification will be described. The distributor terminal 10*i* is different from the distributor terminal 10 in that the distributor U can select a sound processing parameter Pa whose operation authority is to be transferred to the listener L. Specifically, when specifying the operation listener terminal TR, the distributor terminal 10*i* accepts selection of the sound processing parameter Pa permitted to be changed. The distributor terminal 10*i* permits the operation listener terminal TR to change the selected sound processing parameter Pa only. For instance, if the distributor U selects mix balance as the sound processing parameter Pa permitted to be changed, the operation listener terminal TR can adjust the mix balance only. Thus, the distributor U can cause the operator LL to adjust only the sound processing parameter Pa desired by the distributor U.

Other Embodiments

The distributor terminals 10 through 10*e* in accordance with the present disclosure are not limited to the distributor terminals 10 through 10*e* in accordance with the above-mentioned embodiments, but can be modified within the gist of the present disclosure. Note that, configurations of the distributor terminals 10 through 10*e* may be combined as necessary.

Note that, the distributor terminal 10 and the distributor terminals 10*b* through 10*e* may not necessarily obtain the sound processing parameter Pa, which is set in the audio equipment 30, from the audio equipment 30. Accordingly, the distributor terminal 10 and the distributor terminals 10*b* through 10*e* may not necessarily transmit the sound processing parameter Pa, which is set in the audio equipment 30, to the operation listener terminal TR. In this case, the operation listener terminal TR may not necessarily display the received sound processing parameter Pa set in the audio equipment 30.

Note that, when specifying the operation listener terminal TR, the distributor terminals 10 and 10*a* and the distributor terminals 10*c* through 10*e* may not transmit notification information, which indicates that the operation listener terminal TR is specified, to the operation listener terminal TR.

Note that, the distributor terminals 10 through 10*b* and the distributor terminals 10*d* and 10*e* may not necessarily display the sound processing parameter PaAf after being changed by the operation listener terminal TR.

Note that, in the example shown in FIG. 4, a change of the sound processing parameter Pa is accepted by operating a fader or a knob displayed on the display 200*c*. However, a method for the operation listener terminal TR to accept a change of the sound processing parameter Pa is not limited to the example performed by operating a fader or a knob. For instance, the operation listener terminal TR may accept a change of the sound processing parameter Pa based on a numerical value inputted by the operator LL. For instance, the operator LL inputs a value of 20 dB as a gain value. In this case, the operation listener terminal TR may output a sound processing parameter Pa of gain=20 dB to the audio equipment 30.

Note that, the distributor terminals 10 through 10*c* and the distributor terminal 10*e* may not necessarily perform the processing that releases specification of the operation listener terminal TR.

Note that, the distributor terminals 10 through 10*d* may not necessarily distribute content through one or more listener terminals 20 and the server 60*e*. In other words, the distributor terminals 10 through 10*d* may not necessarily specify the operation listener terminal TR, which operates a change of the sound processing parameter Pa of the audio equipment 30, among the one or more listener terminals 20 through the server 60*e*. Similarly, the operation listener terminal TR may not necessarily transmit the changed sound processing parameter Pa to the audio equipment 30 through the server 60*e*.

Note that, the server 60*e* may not necessarily be a distribution server.

Note that, the distributor terminal 10 may be connected to another audio equipment other than the audio equipment 30.

Note that, the number of connections between the distributor terminal 10 and the listener terminals 20 is not limited to the examples shown in FIGS. 1 and 4. The distributor terminal 10 may be connected to one or two listener terminals 20. Further, the distributor terminal 10 may be connected to four or more listener terminals 20.

Note that, the distributor terminal 10 and the listener terminal 20 may not necessarily be connected by the P2P.

Note that, the distributor terminal 10*e* and the listener terminal 20 may be connected through a plurality of servers, in addition to the server 60*e*.

Note that, the sound processing parameter Pa may include any values other than a gain value or a mix balance value. The sound processing parameter Pa may include an equalizer value, a level value, and the like, for example.

Note that, the audio equipment 30 may not necessarily be a mixer.

Note that, the external device 40 may not necessarily be a speaker or a microphone.

Note that, the processor 105 may not necessarily be a CPU. The processor 105 may be an MPU (Micro Processing unit) or the like, for example.

Note that, in the second embodiment, the operation listener terminal TR may obtain parameters of the audio equipment 30 in real time.

Note that, in the second embodiment, a method for the distributor terminal 10*a* to cause the operation listener terminal TR to display the sound processing parameter PaBe is not limited to only the method performed by causing the operation listener terminal TR to display a text message.

Note that, in the third embodiment, a method for the distributor terminal 10*b* to cause the operation listener terminal TR to display the notification information is not limited to only the method performed by causing the operation listener terminal TR to display a text message.

Note that, in the fourth embodiment, a method for the distributor terminal 10*c* to display the sound processing parameter PaAf is not limited to the method performed by displaying a fader and a knob through the GUI. The distributor terminal 10*c* may display a value of the sound processing parameter PaAf using a text message, for example.

Note that, a physical controller may be used for changing the sound processing parameter Pa. The physical controller is provided with a fader, a knob, and the like, for example. The operator LL changes the sound processing parameter Pa by operating the fader, the knob, or the like. At this time, the operation listener terminal TR and the physical controller are connected by a cable, for example. In this case, the operation listener terminal TR and the physical controller are connected through a physical interface (e.g., USB), for example.

What is claimed is:

1. A sound processing method of operating audio equipment to perform sound processing relating to audio content, the sound processing method comprising:
- communicating a distributor terminal with the audio equipment and at least one listener terminal;
- distributing, using the distributor terminal, the audio content from the distributor terminal to the at least one listener terminal;
- specifying, using the distributor terminal, an operation listener terminal, from among the at least one listener terminal, that is permitted to change a sound processing parameter of the audio equipment;
- accepting, using the operation listener terminal, the sound processing parameter changed by the operation listener terminal;
- transmitting, using the operation listener terminal, the sound processing parameter changed by the operation listener terminal to the distributor terminal; and
- performing, using the audio equipment, the sound processing based on the changed sound processing parameter changed by the operation listener terminal.

2. The sound processing method according to claim 1, further comprising:
- obtaining, using the distributor terminal, the sound processing parameter, which is set in the audio equipment, from the audio equipment;
- transmitting, using the distributor terminal, the sound processing parameter set in the audio equipment to the operation listener terminal; and displaying, using a display of the operation listener terminal, the received sound processing parameter set in the audio equipment.

3. The sound processing method according to claim 1, wherein:

the specifying of the operation listener terminal causes the distributor terminal to transmit notification information to the operation listener terminal, the notification information indicating that the operation listener terminal is specified, and the sound processing method further comprises displaying, using a display of the operation listener terminal, information that is based on the notification information.

4. The sound processing method according to claim 1, further comprising displaying, using a display of the distributor terminal, the changed sound processing parameter.

5. The sound processing method according to claim 1, further comprising:

causing the distributor terminal to accept, after specifying the operation listener terminal, release of the operation listener terminal that has been specified; and causing the distributor terminal to release the operation listener terminal that has been specified upon accepting the release of the operation listener terminal.

6. The sound processing method according to claim 1, wherein:

in the distributing of the audio content, the distributor terminal distributes the audio content to the at least one listener terminal through a server, in the specifying of the operation listener terminal, the distributor terminal specifies the operation listener terminal through the server, and in the transmitting of the changed sound processing parameter to the audio equipment, the operation listener terminal transmits the changed sound processing parameter to the audio equipment through the server.

7. The sound processing method according to claim 6, wherein the server is a distribution server that distributes the audio content to the at least one listener terminal.

8. A distributor terminal communicable with audio equipment that performs sound processing relating to audio content and to at least one listener terminal, the distributor terminal comprising:

a processor configured to:

communicate with the audio equipment and the at least one listener terminal;

distribute the audio content from the audio equipment to the at least one listener terminal;

specify an operation listener terminal, from among the at least one listener terminal, that is permitted to change a sound processing parameter of the audio equipment;

receive the sound processing parameter of the audio equipment changed by the operation listener terminal from the operation listener terminal; and transmit the received changed sound processing parameter to the audio equipment, wherein the audio equipment performs the sound processing based on the changed sound processing parameter changed by the operation listener terminal.

9. The distributor terminal according to claim 8, wherein:

the operation listener terminal includes a listener display;

the processor is further configured to:

obtain the sound processing parameter, which is set in the audio equipment, from the audio equipment; and transmit the sound processing parameter set in the audio equipment to the operation listener terminal, and the listener display displays the received sound processing parameter set in the audio equipment.

10. The distributor terminal according to claim 8, wherein:

the operation listener terminal includes a listener display, the processor, in specifying the operation listener terminal, transmits notification information to the operation listener terminal, the notification information indicating that the operation listener terminal is specified, and the listener display displays information that is based on the notification information.

11. The distributor terminal according to claim 8, further comprising a distributor display that displays the changed sound processing parameter.

12. The distributor terminal according to claim 8, wherein the processor is further configured to:

accept, after specifying the operation listener terminal, release of the operation listener terminal that has been specified; and release the operation listener terminal that has been specified upon accepting the release of the operation listener terminal.

13. The distributor terminal according to claim 8, wherein the processor:

in distribution the audio content to the at least one listener terminal, distributes the audio content to the at least one listener terminal through a server, in specifying the operation listener terminal, specifies the operation listener terminal through the server, and in receiving the changed sound processing parameter from the operation listener terminal, receives the changed sound processing parameter from the operating listener terminal through the server.

14. The terminal according to claim 13, wherein the server is a distribution server that distributes the audio content to the at least one listener terminal.

15. A sound system comprising at least one listener terminal;

audio equipment that performs sound processing related to audio content; and a distributor terminal communicable with the audio equipment and the at least one listener terminal, wherein the distributor terminal comprises a processor configured to:

communicate with the audio equipment and the at least one listener terminal;

distribute the audio content from the audio equipment to the at least one listener terminal;

specify an operation listener terminal, from among the at least one listener terminal, that is permitted to change the sound processing parameter of the audio equipment;

receive the sound processing parameter of the audio equipment changed by the operation listener terminal from the operation listener terminal; and transmit the received changed sound processing parameter to the audio equipment, wherein the audio equipment performs the sound processing based on the changed sound processing parameter changed by the operation listener terminal.

16. The sound system according to claim 15, wherein:

the processor is configured to:

obtain the sound processing parameter, which is set in the audio equipment, from the audio equipment; and transmit the sound processing parameter set in the audio equipment to the operation listener terminal, and the operation listener terminal includes a display that displays the received sound processing parameter set in the audio equipment.

17. The sound system according to claim 15, wherein:

the processor, in specifying the operation listener terminal, transmits notification information to the operation listener terminal, the notification information indicating that the operation listener terminal is specified, and the operation listener terminal includes a display that displays information that is based on the notification information.

18. The sound system according to claim 15, wherein the distributor terminal includes a display that displays the changed sound processing parameter.

19. The sound system according to claim 15, wherein the processor is further configured to:

accept, after specifying the operation listener terminal, release of the operation listener terminal that has been specified; and release the operation listener terminal that has been specified upon accepting the release of the operation listener terminal.

20. The sound system according to claim 15, wherein the processor:

in distribution the audio content to the at least one listener terminal, distributes the audio content to the at least one listener terminal through a server;

in specifying the operation listener terminal, specifies the operation listener terminal through the server, and in receiving the changed sound processing parameter from the operation listener terminal, receives the changed sound processing parameter from the operating listener terminal through the server.

* * * * *